(12) United States Patent
Okoli et al.

(10) Patent No.: US 11,243,100 B1
(45) Date of Patent: Feb. 8, 2022

(54) WIRELESS, BATTERY-POWERED SENSOR

(71) Applicant: ABL IP Holding LLC, Atlanta, GA (US)

(72) Inventors: Chukwunonso Okoli, Lilburn, GA (US); John Richard Johnson, Flowery Branch, GA (US); Jonathan Lusk, Conyers, GA (US)

(73) Assignee: ABL IP Holding LLC, Atlanta, GA (US)

(*) Notice: Subject to any disclaimer, the term of this patent is extended or adjusted under 35 U.S.C. 154(b) by 10 days.

(21) Appl. No.: 16/940,670

(22) Filed: Jul. 28, 2020

(51) Int. Cl.
| | |
|---|---|
| *G01D 21/00* | (2006.01) |
| *G01D 11/24* | (2006.01) |
| *G01D 21/02* | (2006.01) |
| *H01Q 7/00* | (2006.01) |
| *G01V 8/00* | (2006.01) |
| *G01V 1/00* | (2006.01) |

(52) U.S. Cl.
CPC ........... *G01D 11/245* (2013.01); *G01D 21/02* (2013.01); *G01V 1/001* (2013.01); *G01V 8/00* (2013.01); *H01Q 7/00* (2013.01)

(58) Field of Classification Search
CPC ...... G01D 11/245; G01D 21/02; G01V 1/001; G01V 8/00; H01Q 7/00
See application file for complete search history.

(56) References Cited

U.S. PATENT DOCUMENTS

RE47,511 E      7/2019  Blakeley et al.
2021/0135344 A1* 5/2021 O'Driscoll ............... H01Q 1/38

FOREIGN PATENT DOCUMENTS

| CN | 107134634 A | * | 9/2017 |
| CN | 207249138 U | * | 4/2018 |

OTHER PUBLICATIONS

"Passive Infrared Ceiling Sensors", Legrand, Available online at: www.legrand.us/wattstopper, Nov. 2017, 2 pages.
"Radio Powr Savr Wireless Occupancy/Vacancy Ceiling Sensor", Lutron, Radio Powr Savr, Nov. 12, 2018, 6 pages.

* cited by examiner

*Primary Examiner* — Jamel E Williams
(74) *Attorney, Agent, or Firm* — Kilpatrick Townsend & Stockton LLP

(57) ABSTRACT

A sensor that that can be, but do not have to be, communicatively coupled with luminaires, includes a sensor module having an electronics board and a battery enclosure. The electronics board includes a sensing component, a controller, and a flex antenna. The battery enclosure is couple with the electronics board and includes a base and a side wall having an outer wall surface. The flex antenna is supported on the outer wall surface such that the flex antenna forms a radially outermost portion of the sensor module, and the flex antenna is conformable to a profile of the outer wall surface. In certain aspects, the sensor module is configured to support a power source on the sensor module. In some cases, the sensor is an indoor sensor.

20 Claims, 17 Drawing Sheets

WIRELESS, BATTERY-POWERED SENSOR

FIELD OF THE INVENTION

The present invention relates to sensors that can be, but do not have to be, communicatively coupled with luminaires.

BACKGROUND

Sensors may be integrated with systems such as luminaire systems to provide an indication of some detected event and/or to trigger an event on another device. For example, an occupancy sensor may turn luminaires on and off based on a detected occupancy or motion in a particular area. Existing sensors typically rely on fasteners to hold separate components together and have battery connectors that are wired to a printed circuit board as well as wire antennas that are held in place by mechanical features. These existing sensors may be susceptible to detuning or may otherwise negatively impact wireless communication performance and require the use of tools or secondary assembly processes (e.g., hand soldering) that increase cycle time (assembly and/or disassembly) and cost.

SUMMARY

The terms "invention," "the invention," "this invention" and "the present invention" used in this patent are intended to refer broadly to all the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings, and each claim.

According to certain embodiments, a sensor includes a sensor module having an electronics board and a battery enclosure. The electronics board includes a sensing component, a controller, and a flex antenna. The battery enclosure is coupled with the electronics board and includes a base and a side wall having an outer wall surface. In various examples, the flex antenna is supported on the outer wall surface such that the flex antenna forms a radially outermost portion of the sensor module, and the flex antenna may be conformable to a profile of the outer wall surface. In some examples, the sensor module is configured to support a power source on the sensor module. In various aspects, the sensor is an indoor sensor.

According to some embodiments, a sensor includes a sensor module and a sensor cover. The sensor module includes an electronics board and a battery enclosure. The electronics board is coupled with the battery enclosure and includes a sensing component. The sensor cover includes a housing, an optic, and an optic retainer. The housing includes an inner surface defining a sensor module receiving area, and the sensor module may be received within the sensor module receiving area. The housing may also define an optic aperture and a button aperture. The optic may be supported on the housing and extend at least partially through the optic aperture. The optic retainer includes a base and at least one post extending from the base. The base of the optic retainer includes a button that is positionable within the button aperture and movable relative to the base such that the button selectively engages the sensor module. In various aspects, the optic retainer is positionable within the sensor module receiving area such that the base engages the optic, at least a portion of the optic is retained between the base and the inner surface of the housing, and the at least one post engages the sensor module.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
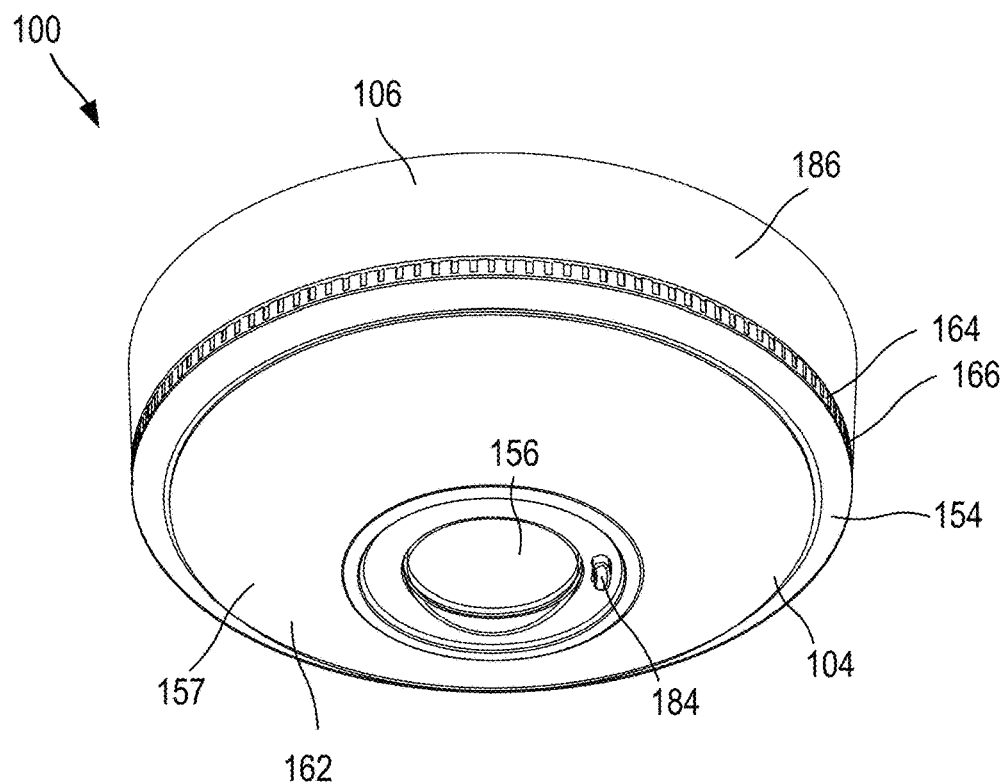
FIG. 1 is a perspective view of a sensor according to embodiments of the disclosure.

The subject matter of features of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

Described herein is a sensor that can be, but does not have to be, communicatively coupled with one or more luminaires. In various aspects, the sensor may wirelessly communicate with luminaires or other devices with wireless components to trigger a response event based on a detected event. As one non-limiting example, the sensor may be in wireless communication with one or more luminaires, and the light sources on the one or more luminaires may be activated based on an event detected by the sensor and communicated by the sensor to the luminaire. In some aspects, the sensor may be an indoor sensor, although it need not be in other examples. The sensor includes a sensing component that may be any suitable type of sensing component for detecting an event. As some non-limiting examples, the sensing component may include, but is not limited to, a passive infrared sensing component or other suitable motion or occupancy sensing component, a photodiode or other light sensing component, a microphonic circuit or other sound sensing component, a humidity sensing component, an air quality sensing component, a smoke sensing component, a temperature sensing component, and/or a carbon dioxide sensing component.

The sensor includes a sensor module, a cover, and a base. In certain aspects, the sensor module is modular and can be provided with various types and/or configurations of covers and bases as desired. The sensor may be self-contained and wireless in that it supports its own power source(s) and thus does not require connection to an external power source. The sensor module includes an electronics board and a battery enclosure. The electronics board includes a flex antenna, and the flex antenna is supported on the battery enclosure such that it is a radially outermost component of the sensor module. In certain aspects, the flex antenna on the battery enclosure may maximize the distance between the flex antenna and other metal components on the sensor module and minimize or prevent the antenna from being detuned due to metallic interference. In various aspects, the sensor may be a tools-free assembly, meaning that it can be assembled and/or disassembled without requiring other tools.

Referring to FIGS. 1-15, in various embodiments, a sensor 100 includes a sensor module 102, a cover 104, and a base 106, each of which will be discussed in greater detail below. In certain aspects, the sensor 100 is an indoor sensor for an indoor environment, although in other examples, the sensor may be provided in various environments as desired. It will be appreciated that the particular shape and size of the sensor module 102, the cover 104, and the base 106, as well as sub-components of each, should not be considered limiting on the current disclosure. While light sources are described herein as light emitting diodes (LEDs), it will be recognized that the invention may be embodied in sensors using other kinds of light sources, for example fluorescent, incandescent, halogen, etc.

Sensor Module

As best illustrated in FIGS. 1-4, 8, 9, and 11, in various examples, the sensor module 102 includes a battery enclosure 108 and an electronics board 110.

Figure 8:
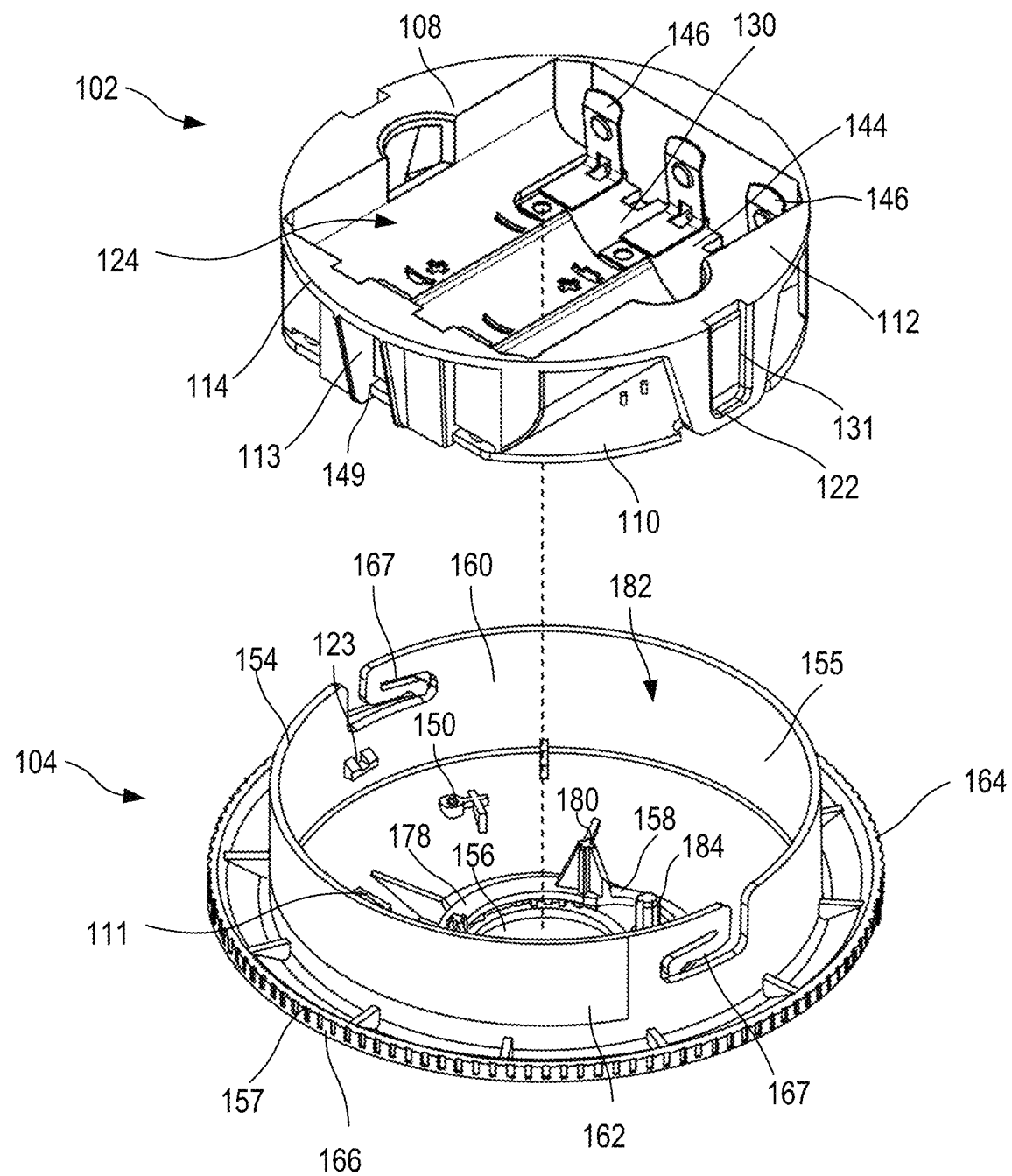
FIG. 8 illustrates the sensor module of FIG. 3 removed from the cover assembly of FIG. 5.

The battery enclosure 108 includes a base 112 having a perimeter edge 114. In various examples, the battery enclosure 108 is constructed from a non-metallic material, such as a polymeric material. As best illustrated in FIG. 8, the base 112 defines a power source cavity 124 that selectively receives one or more power sources such as batteries 126 (see FIG. 11). In various aspects, the power source cavity 124 includes one or more contact apertures 128. As discussed in detail below, when the electronics board 110 is assembled with the battery enclosure 108, power source contacts 146 of the electronics board 110 may extend through the contact aperture(s) 128 and into the power source cavity 124.

A side wall 116 having a side wall surface 118 extends from and along at least a portion of the perimeter edge 114 of the base 112. In some examples, the battery enclosure 108 includes one or more engagement arms 120 that selectively form a snap-fit engagement with the electronics board 110 as discussed in detail below. One or more retention arms 121 are provided on the opposing side of the battery enclosure 108, the purpose of which will be described below. The shape, number, or location of engagement arms 120 and retention arms 121 should not be considered limiting on the current disclosure. Moreover, in other examples, the engagement arms 120 and/or retention arms 121 may be omitted, and the battery enclosure 108 may be selectively coupled to the electronics board 110 using various other suitable components or mechanisms. Optionally, the base 112 may also include one or more retention tabs 122, and each retention tab 122 includes a positioning aperture 131 that is configured to selectively retain a retention tab 123 on a housing 154 of the cover 104.

In other examples, various other suitable mechanisms may be utilized to orient and position the electronics board 110 relative to the battery enclosure 108.

Figure 3:
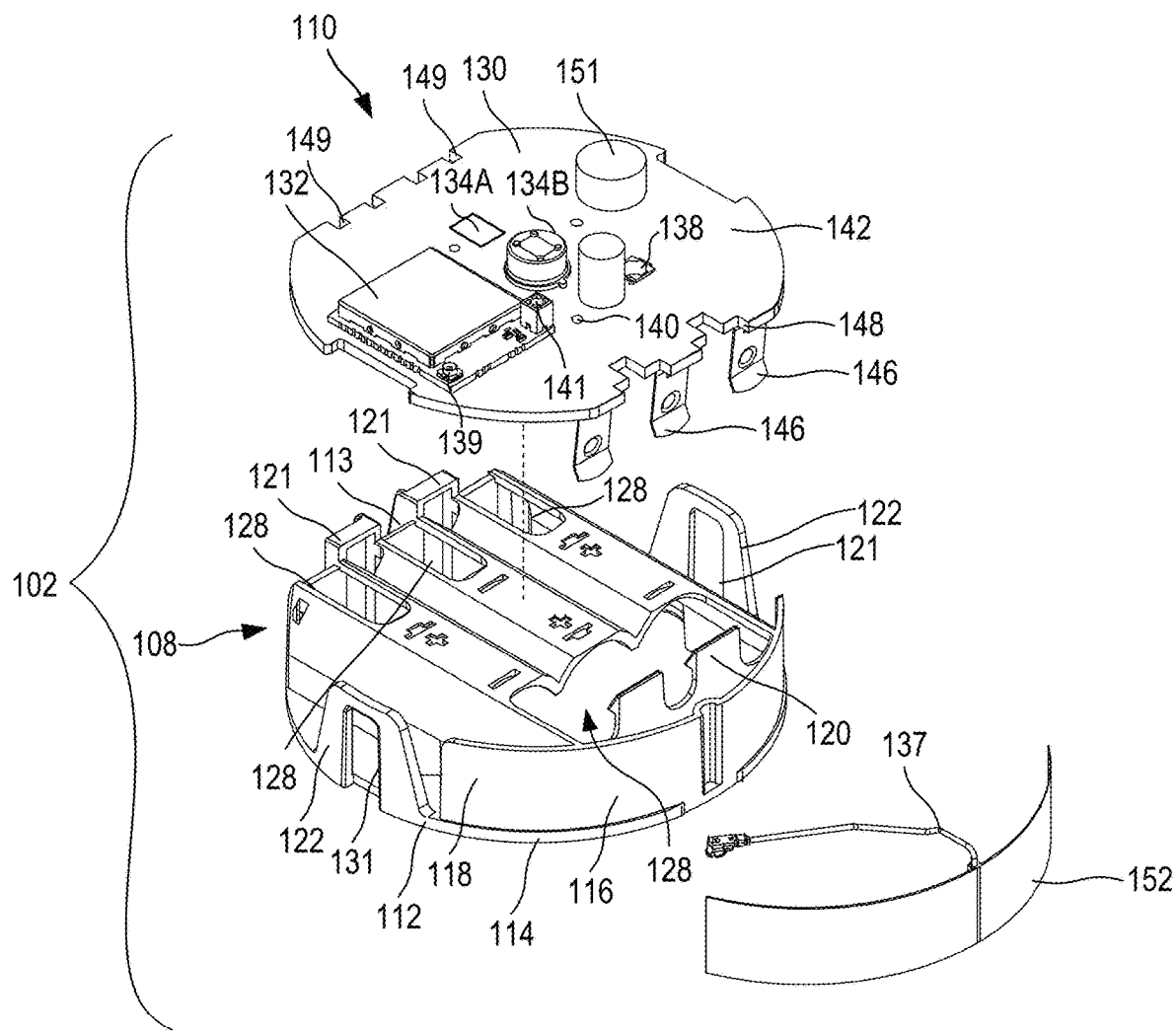
FIG. 3 is an exploded view of a sensor module of the sensor of FIG. 1.
Figure 4:
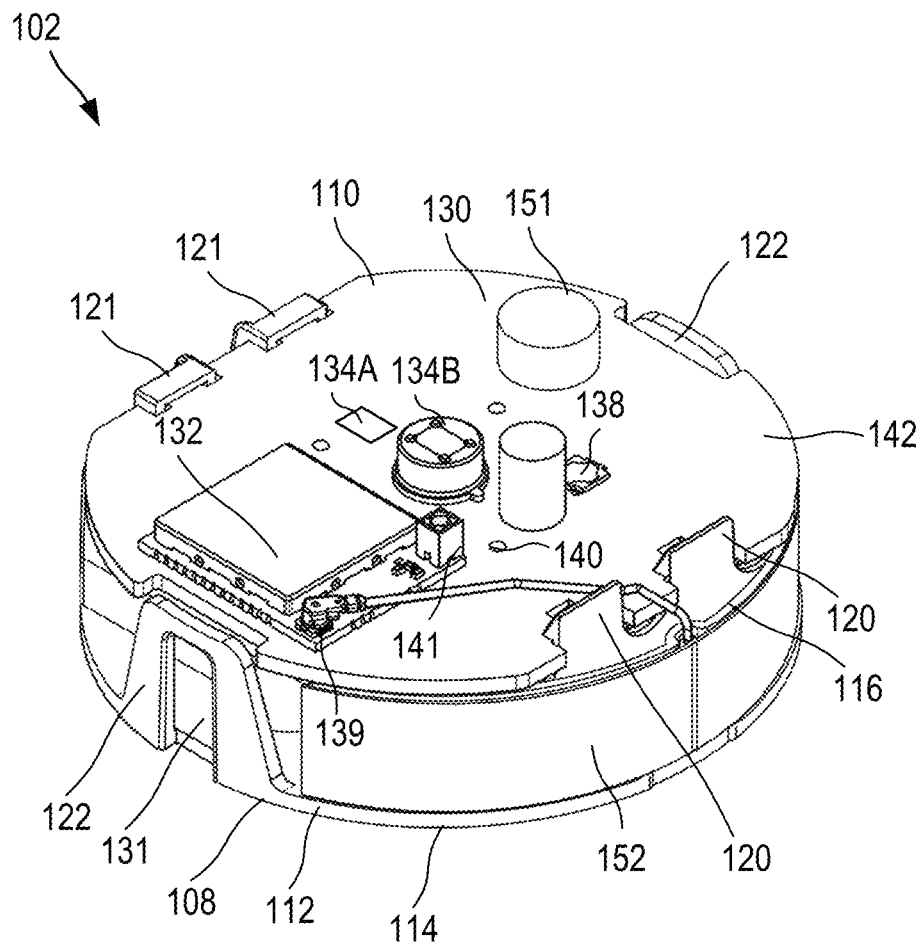
FIG. 4 is a perspective view of the sensor module of FIG. 3 assembled.

As best illustrated in FIGS. 3 and 4, the electronics board 110 includes a printed circuit board (PCB) 130, a controller 132, one or more sensing components 134, and an antenna 152. The electronics board 110 may optionally include a speaker 151, a secondary antenna 141, an activation switch 138, and/or a light source 140.

The PCB 130 includes a first side 142 and a second side 144 (see FIG. 8) opposite from the first side 142. In certain examples, the controller 132 and the sensing component 134 may be provided on the first side 142 of the PCB 130 (as well as the activation switch 138 and light source 140 when included). In some examples, one or more power source contacts 146 are mounted on and extend from opposing sides of the PCB 130. The power source contacts 146 may be mounted on the PCB 130 through various suitable techniques or mechanisms, including, but not limited to, soldering. As illustrated in FIG. 3, in various embodiments the contacts 146 may extend away from the second side 144 and in a direction opposite from the first side 142. In various aspects, the contacts 146 with the PCB 130 may optionally omit the need for additional wiring between the contacts 146 (and thus a power source) and the other components supported on the PCB 130. As best illustrated in FIG. 8, when the electronics board 110 is assembled with the battery enclosure 108, the contacts 146 may extend through the contact apertures 128 and into the power source cavity 124. Power sources such as the batteries 126 may be received within the power source cavity 124 and into electrical engagement with the contacts 146.

The PCB 130 also includes one or more engagement notches 148 that form a snap-fit engagement with the engagement arms 120 of the battery enclosure 108. The PCB 130 may also include one or more retention notches 149 that are selectively engaged with the retention arm(s) 121 as discussed in greater detail below. The number, shape, size, or location of the engagement notches 148 and/or retention notches 149 should not be considered limiting on the current disclosure.

The sensing component(s) 134 may be various suitable devices or components for detecting an event. In the embodiment illustrated, the electronics board 110 includes two sensing components 134A-B. However, in other examples, the electronics board 110 may include a single sensing component or more than two sensing components. As some non-limiting examples, the sensing components may include, but is not limited to, a motion sensing component (e.g., a passive infrared sensor), an occupancy sensing component, a light sensing component, a sound sensing component, a humidity sensing component, an air quality sensing component, a smoke sensing component, a temperature sensing component, and/or a carbon dioxide sensing component. In the embodiment illustrated, the sensing component 134A is a light sensing component (e.g., a photodiode) and the sensing component 134B is a motion sensing component.

In certain embodiments, the antenna 152 is a flex antenna that is flexible and conformable to a shape or profile of a surface on which the antenna 152 is mounted. In some examples, the antenna 152 consists of copper traces provided on a tape-like substrate (e.g., Kapton tape). As best illustrated in FIG. 4, the antenna 152 is supported on side wall surface 118 of the side wall 116 of the battery enclosure 108. An adhesive and/or other suitable support mechanisms may be utilized to support the antenna 152 on the side wall surface 118. In various aspects, the antenna 152 on the side wall surface 118 is an outermost component of the sensor module 102. The antenna 152 on the side wall surface 118 may minimize potential detuning of the antenna 152 by maximizing a distance between the antenna 152 and other metal components of the sensor module 102 (such as the contacts 146). The antenna 152 interfaces with the PCB 130 via a cable 137 and RF connector 139.

In some examples, the light source 140 may include one or more LEDS, which may be single-die or multi-die LEDs, DC or AC, or can be organic LEDs. White, color, or multicolor LEDs may be used. Moreover, the LEDs mounted need not all be the same color; rather, mixtures of LEDs may be used. In various aspects, the controller 132 may control the light source 140 such that light having a predetermined characteristic (e.g., brightness, color, pattern, etc.) is emitted based on the sensor 100 being in the hibernation mode, based on an activation of the activation switch 138, based on an event being detected, and/or based on other suitable events, modes, etc. as desired. In certain aspects, the controller 132 may control the light source 140 such that the characteristic of the light is varied depending on a particular mode, detected event, etc.

The secondary antenna 141 may be various other suitable types of antennas for facilitating wireless communication. In one non-limiting example, the secondary antenna 141 may be a Bluetooth® antenna or other suitable wireless antenna.

The controller 132 is communicatively coupled with the other components of the electronics board 110 and may have various suitable processing and/or memory components for controlling the other components of the electronics board 110. In certain aspects, the controller 132 may control the electronics board 110 such that the components are in a hibernation or low-power mode until an event is detected and/or until the activation switch 138 is activated. As one non-limiting example, the controller 132 may control the electronics board 110 to be in the hibernation mode until one or both of the sensing components 134A-B detect a predetermined pattern of light and/or predetermined pattern of sound. In other examples, the controller 132 may control the electronics board 110 to be in the hibernation mode until the activation switch 138 has been activated (discussed in greater detail below). In various embodiments, the controller 132 may selectively communicate with other wireless components (e.g., wireless luminaires) via the antenna 152 based on the detection of a particular event. As one non-limiting example, the controller 132 may communicate with a wireless luminaire based on the sensing component 134A detecting a particular pattern of light and/or based on the sensing component 134B detecting motion such that the wireless luminaire can be activated or otherwise controlled as desired (e.g., the luminaire may be activated to emit light). Conversely, the controller 132 may communicate with a wireless luminaire (or other wireless components) based on the lack of an event being detected. As one non-limiting example, the controller 132 may communicate with a wireless luminaire based on the sensing component 134A not detecting a particular pattern of light and/or based on the sensing component 134B not detecting motion such that the wireless luminaire can be deactivated or otherwise controlled as desired (e.g., the luminaire may be shut off). In various other examples, the controller 132 may control other components of the sensor 100 and/or other wireless components as desired based on detected or undetected events.

Cover

As best illustrated in FIGS. 1, 2, and 5-10, the cover 104 includes the housing 154, an optic 156, and an optic retainer 158.

Figure 5:
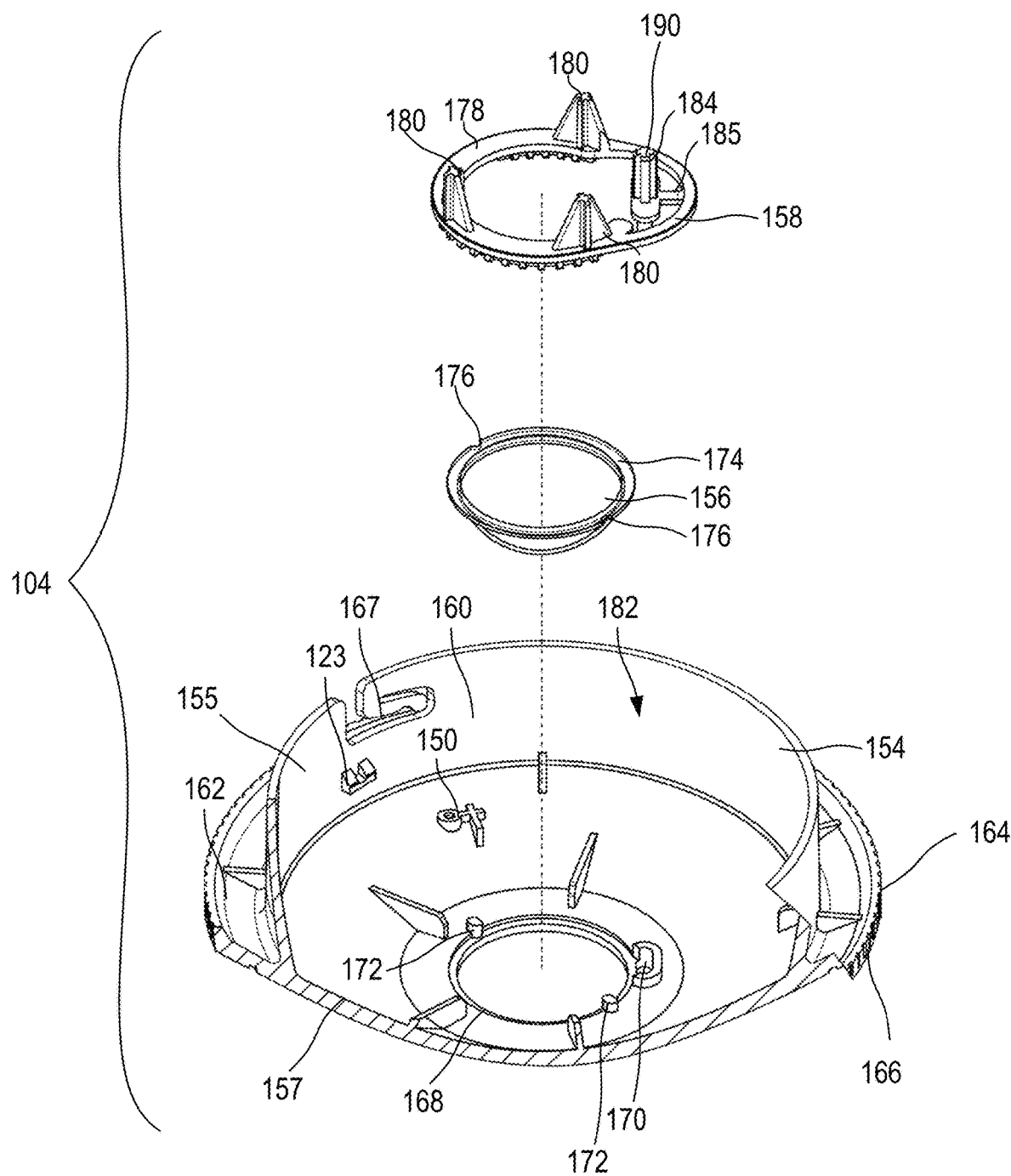
FIG. 5 is an exploded view of a cover assembly of the sensor of FIG. 1.

The housing 154 includes an end wall 157 having an inner surface 160 and a side wall 155 extending upwardly from the end wall 157. The end wall 157 includes a perimeter edge 164 that may at least partially form an outermost portion of the sensor 100 when the sensor is assembled. In some aspects, at least a portion of the perimeter edge 164 may include a gripping feature 166 (e.g., knurling) that a user may selectively grasp to facilitate assembly or disassembly of the sensor 100. In some examples, the side wall 155 of the housing 154 includes base-locking features 167 that selectively engage with the base 106 to couple the cover 104 with the base 106. The end wall 157 and the side wall 155 define a module receiving area 182 that selectively receives the sensor module 102 when the sensor 100 is assembled. As best illustrated in FIG. 5, the end wall 157 of the housing 154 defines an optic aperture 168 and button aperture 170. The relative positioning of the optic aperture 168 and button aperture 170 on the housing 154 and relative to each other should not be considered limiting on the disclosure. In various examples, the inner surface 160 of the end wall 157 optionally includes one or more alignment posts 172 that selectively engage the optic 156 to maintain an orientation of the optic 156 relative to the housing 154. In various cases, the housing 154 includes one or more of the retention tabs 123 on the side wall 155 and within the module receiving area 182 that selectively engage corresponding retention tabs 122 on the battery enclosure 108. In various aspects, the housing 154 is constructed from a non-metal material or other suitable material (e.g., polymeric material) such that a wireless signal can be transmitted from the sensor module 102 when the sensor module 102 is assembled with the cover 104.

As best illustrated in FIGS. 5-8, the housing 154 may optionally include a RF retention feature 150. In certain aspects, the RF retention feature 150 engages or otherwise contacts the RF connector 139 when the cover 104 is assembled with the sensor module 102 to maintain the connection between the antenna 152 and other components of the electronics board 110.

The optic 156 (such as a lens, diffuser, or other suitable optic as desired) is positioned at least partially within the optic aperture 168. In some cases, the optic 156 includes a flange 174 that abuts the inner surface 160 of the end wall 157 and is within the module receiving area 182 as other portions of the optic 156 extend through the optic aperture 168. Optionally, the optic 156 includes one or more alignment notches 176 that selectively engage the alignment posts 172 to position the optic 156 relative to the housing 154. The optic 156 can be made of any non-metallic material that permits the sensing component 134 to sense an event, including, but not limited to, glass, polymeric materials, silicone and various other suitable materials for light distribution. Similarly, the optic 156 may include various coatings, finishes, patterns, etc. as desired. As some non-limiting examples, the optic 156 could be frosted, be a Fresnel lens, or be various other types of optics as desired.

The optic retainer 158 includes a base 178 and at least one post 180 extending from the base 178. When assembled with the optic 156 and the housing 154, the optic retainer 158 is positioned within the module receiving area 182 such that a portion of the optic 156 (e.g., the flange 174) is between the base 178 of the optic retainer 158 and the inner surface 160 of the end wall 157. The at least one post 180 may contact or otherwise engage the sensor module 102, and the contact by the optic retainer 158 with the optic 156 and the sensor module 102 may hold the optic 156 in place. The base 178 of the optic retainer 158 also includes a button 184 that is integrally formed with the base 178 such that the optic retainer 158 is a single component. More specifically, at least one attachment arm 185 connects the button 184 to the base 178. When the optic retainer 158 is assembled with the housing 154, at least a portion of the button 184 extends within and through the button aperture 170 so as to be accessible from below the sensor 100. The attachment arm 185 permits the button 184 to move or deflect relative to the base 178.

The batteries powering the wireless sensor must last for extended lengths of time (e.g., 10 years). Thus, the electronics board 110 includes a circuit that allows the microprocessor to sleep (i.e., not draw power) but that passively monitors the sensing component 134. The button 184 may be used to "wake-up" the sensor 100. More specifically, when the button 184 is depressed, an end 190 of the button 184 contacts the activation switch 138 on the PCB 130. This, in turn, activates the light source 140 which emits light through the optic 156 to indicate that the sensor is operational.

In some alternative examples, the entire optic is not illuminated. Rather, the entire optic retainer 158 (or at least the button 184) may be formed from a clear material such that light from the light source 140 is transmitted through the button 184 as opposed (or in addition to) the optic 156. In this way, the button 184 acts as a light pipe. Similar to the optic 156, at least the button 184 of the optic retainer 158 may have various suitable coatings or other features to control light distribution through the button 184.

In other embodiments, the sensor may be woken up by means other than pushing of a button. For example, light or noise may be used to awaken the sensor from hibernation mode. More specifically, the sensor may be programmed to detect a certain pattern of light such that a flashlight or laser beam moved below the sensor and pursuant to the pattern activates the sensor. Alternatively, a pattern or type of noise may be emitted proximate the sensor to awaken a sensor programmed to detect such noise.

Base

As illustrated in FIGS. 1, 2, and 11-14, the base 106 includes a side wall 186 and an end wall 188 that together define a receiving area 101. The receiving area selectively receives a portion of the cover 104 and/or at least a portion of the sensor module 102. In certain aspects, receiving area receives the side wall 155 of the housing 154 of the cover 104 such that the side wall 186 overlaps the side wall 155. The cover 104 may be attached to the base 106 via any suitable attachment means. In some examples, the base 106 may include locking features 189 that selectively engage the base-locking features 167 such that the cover 104 is coupled with the base 106 via a twist lock connection. The base 106 may be constructed from various suitable materials, including metallic and polymeric materials. In some cases, the base 106 is configured to support the sensor module 102 and the cover 104 on a mounting surface such as a wall, ceiling, or other suitable surface. For example, mounting holes 187 may be provided in the base 106 (such as in the end wall 188) for receipt of screws or other mechanical fasteners to secure the base 106 to a mounting surface 1511 (see FIG. 15). In other examples, the base 106 may be configured as a recessed base 106 that is recessed within the mounting surface, such as above the plenum (see, e.g., FIGS. 16-20), and/or the base 106 may be mountable on another component, including, but not limited to a junction box (see, e.g., FIGS. 21-26). The base 106 may include mounting features suitable for mounting the base 106 on or within a mounting surface, including, but not limited to, springs, clips, hooks, fasteners, pins, or other suitable mounting features as desired.

Figure 2:
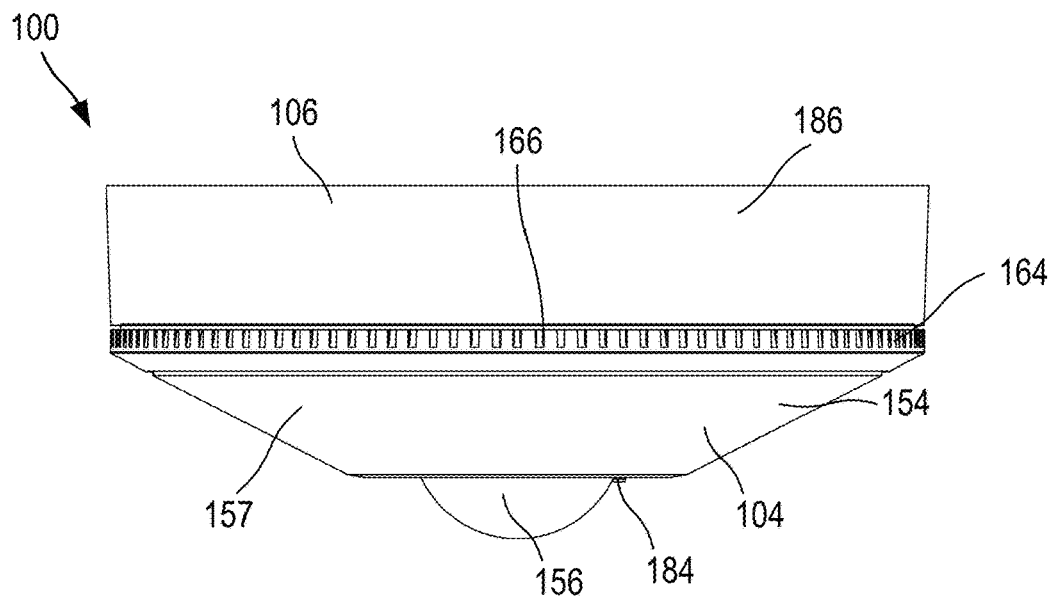
FIG. 2 is a side view of the sensor of FIG. 1.
Figure 15:
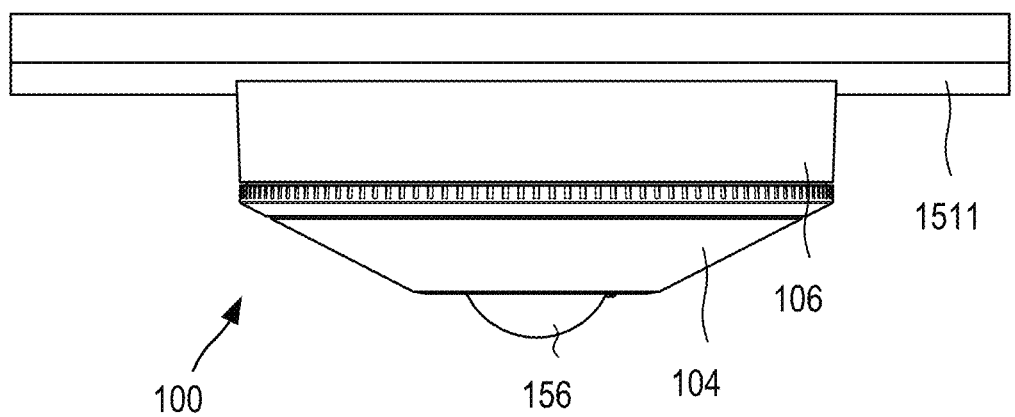
FIG. 15 illustrates the sensor of FIG. 1 mounted on a surface.
Figure 16:
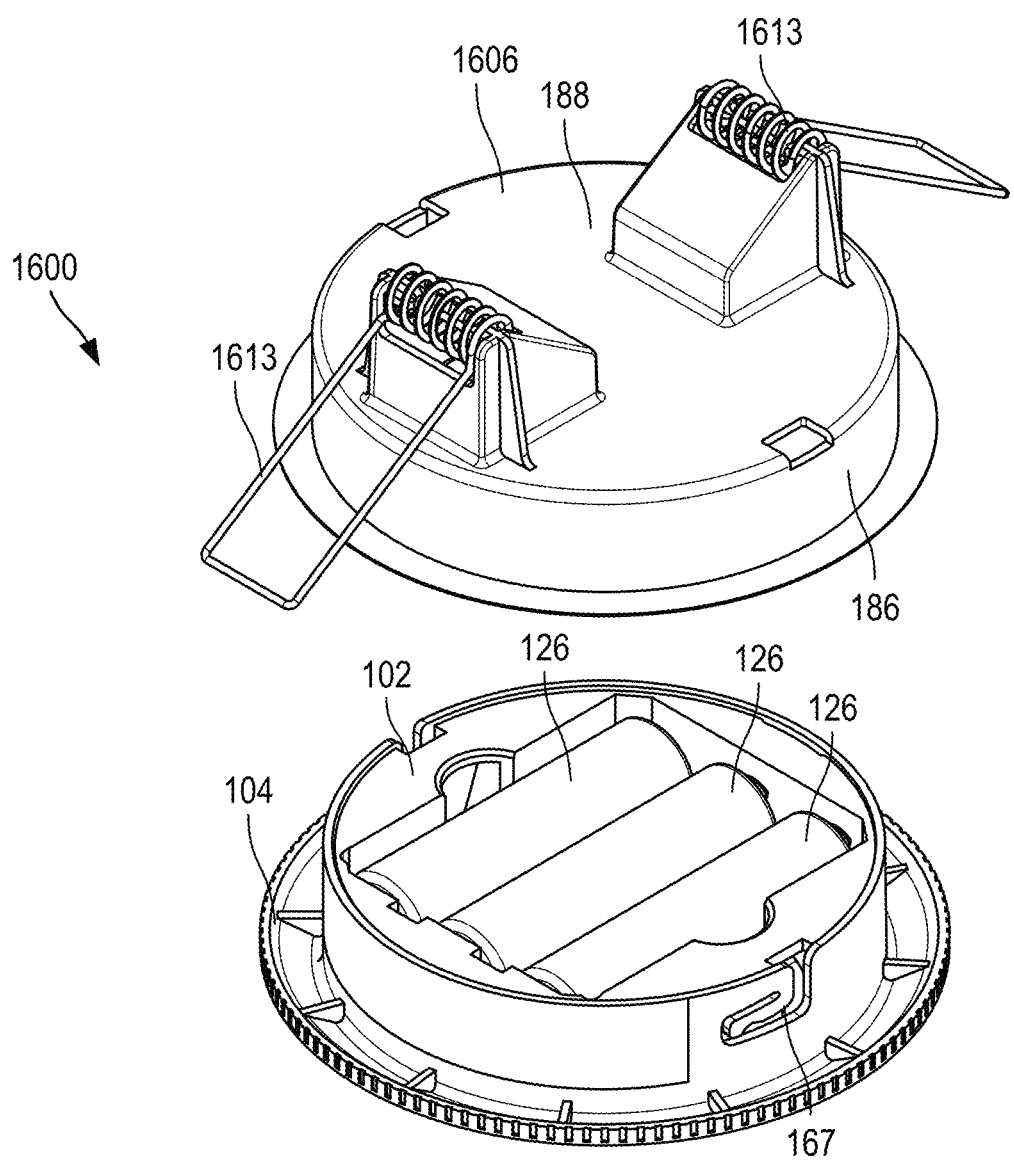
FIG. 16 is an exploded view of a sensor according to various embodiments.
Figure 17:
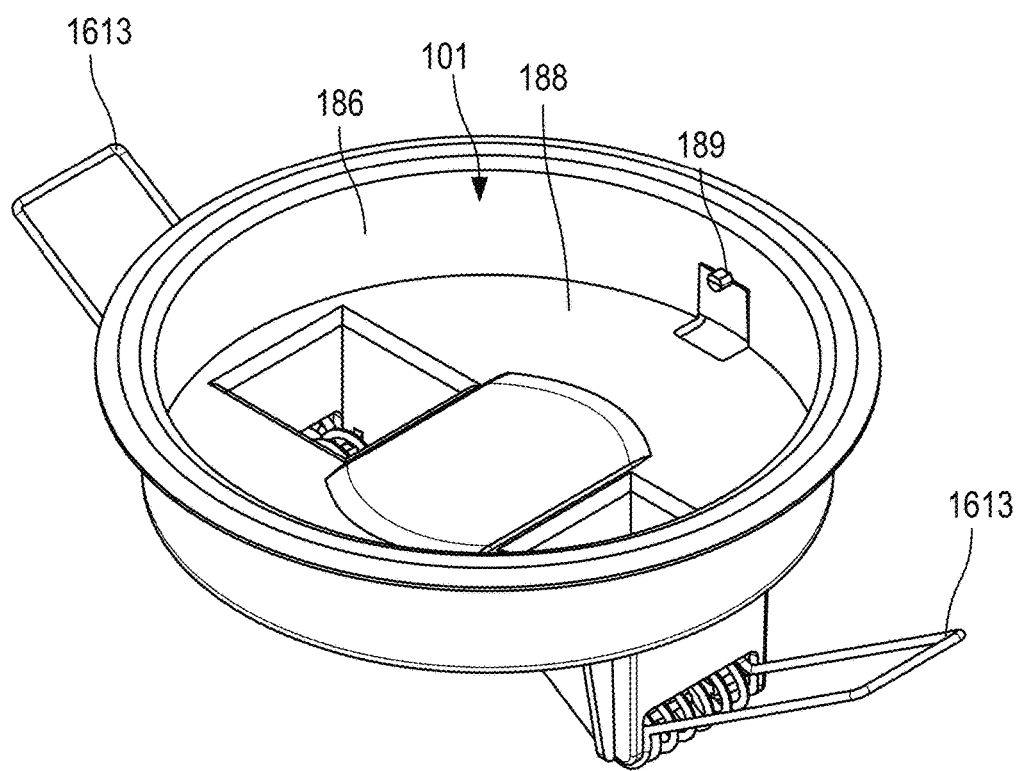
FIG. 17 is a perspective view of a base of the sensor of FIG. 16.
Figure 18:
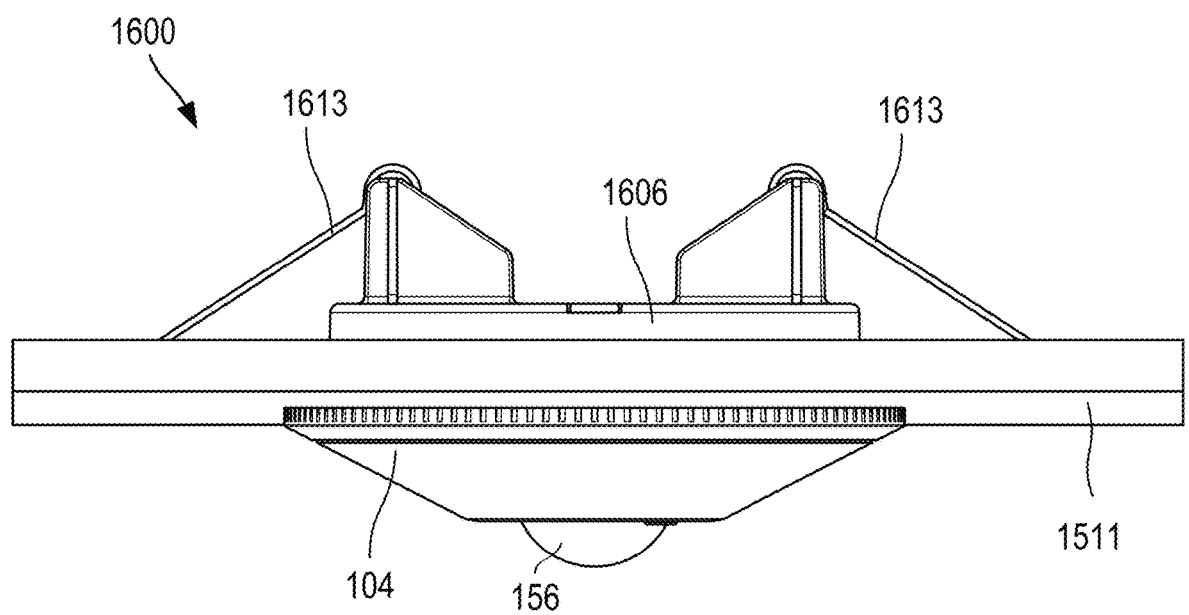
FIG. 18 illustrates the sensor of FIG. 16 mounted at a recessed position within a surface.
Figure 19:
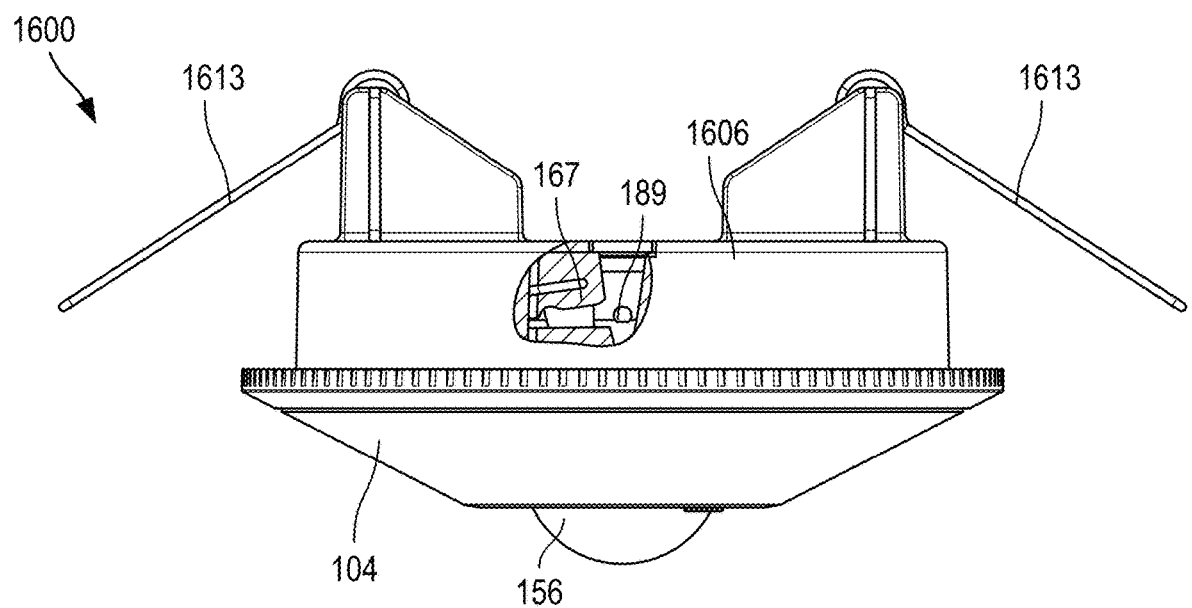
FIG. 19 is a side view of the sensor of FIG. 16 with a cover of the sensor disengaged with the base.
Figure 20:
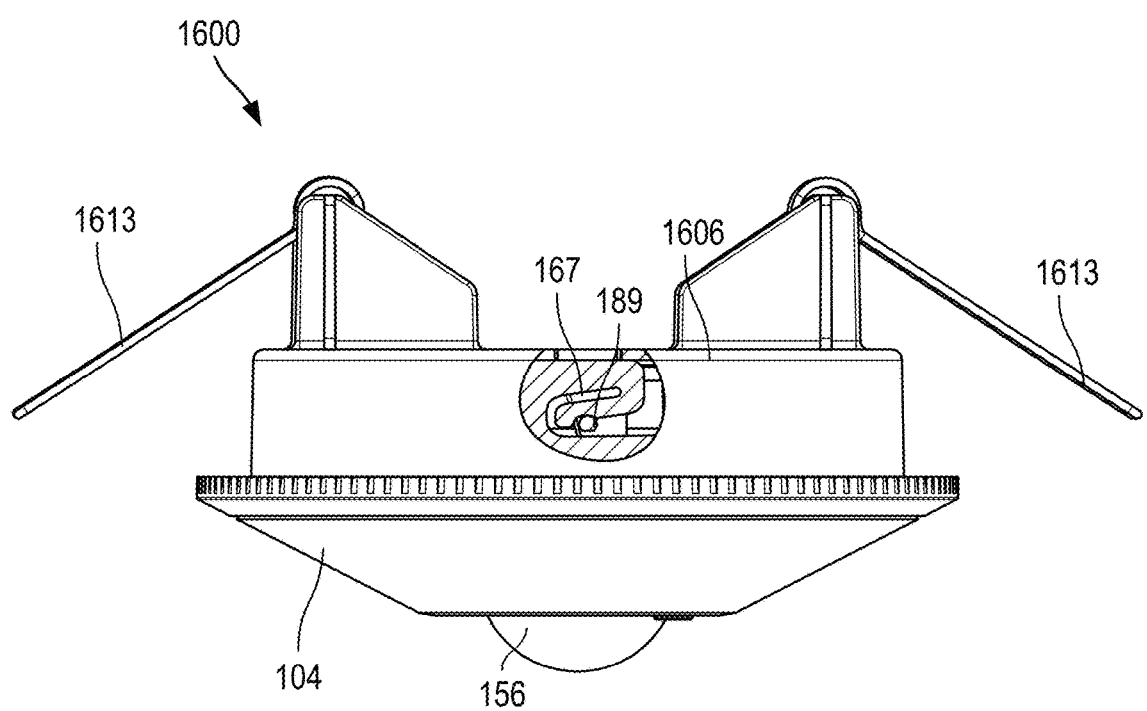
FIG. 20 is a side view of the sensor of FIG. 16 with the cover engaged with the base.
Figure 21:
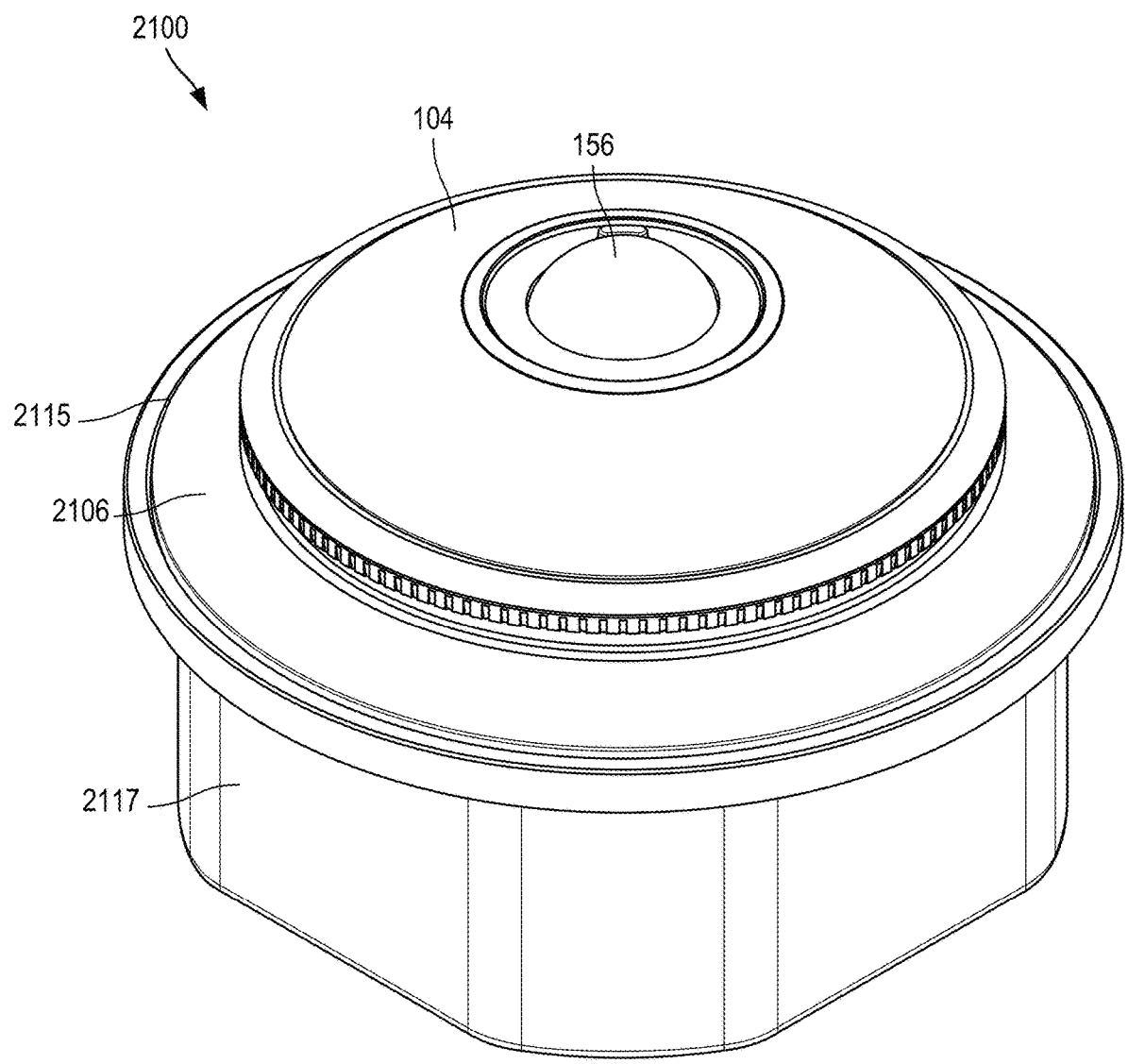
FIG. 21 is a perspective view of a sensor according to various embodiments.
Figure 22:
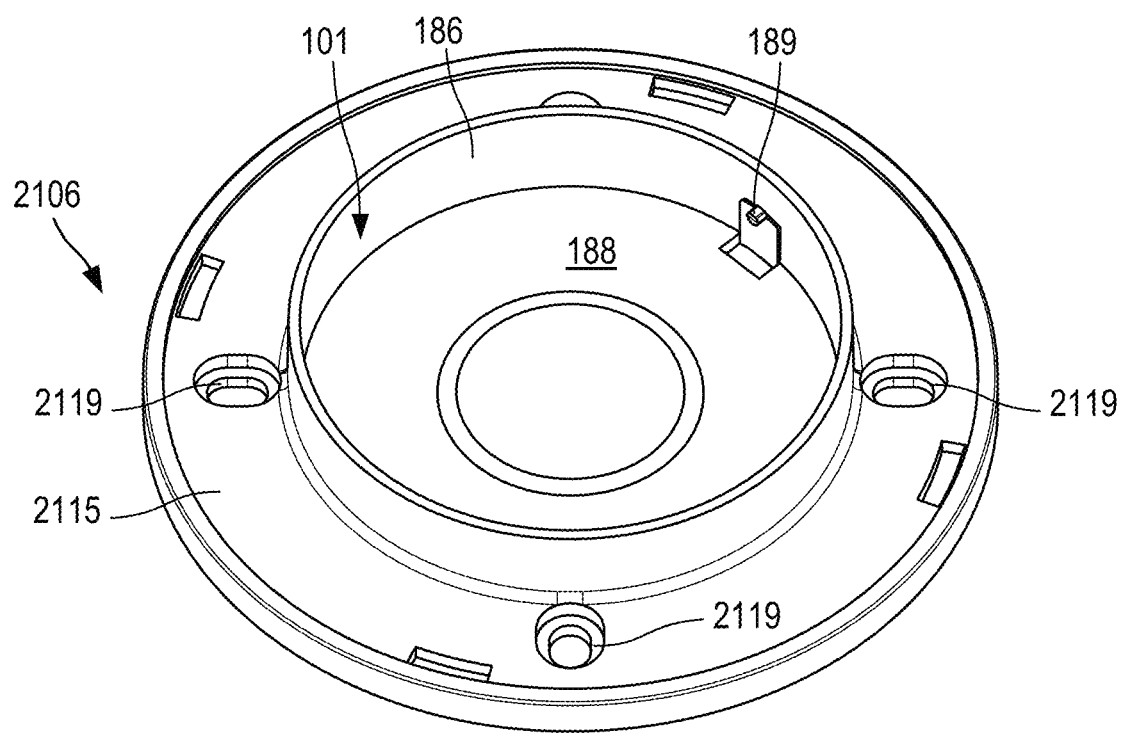
FIG. 22 is a top perspective view of a base of the sensor of FIG. 21.
Figure 23:
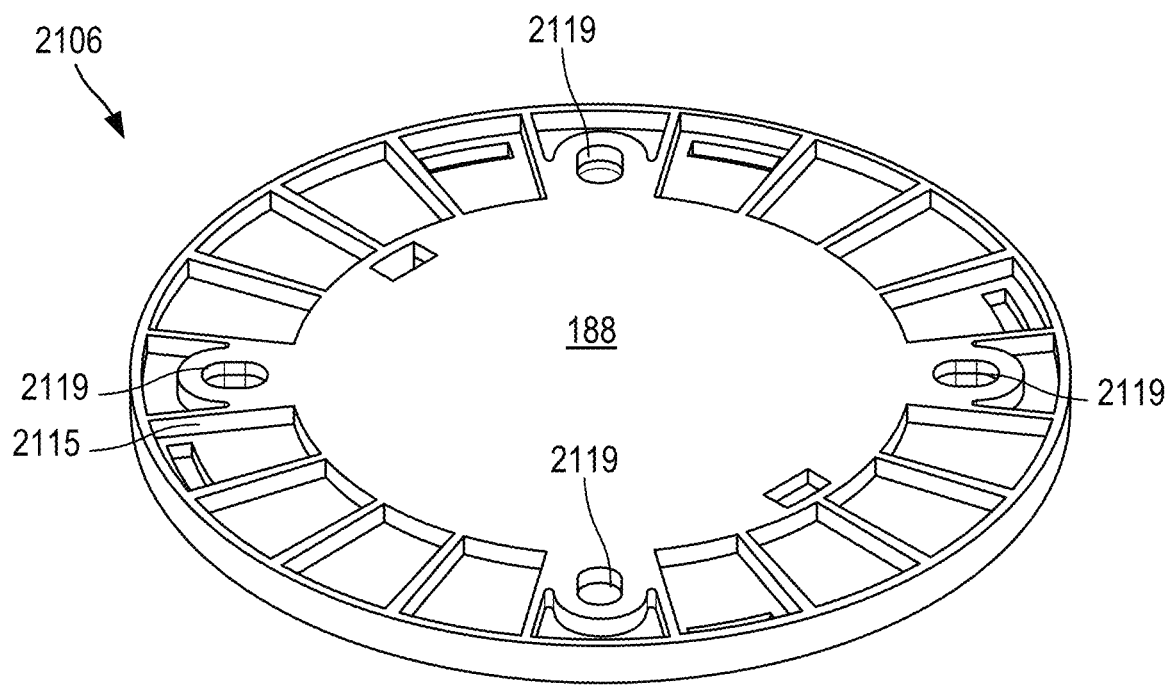
FIG. 23 is a bottom perspective view of the base of FIG. 22.
Figure 24:
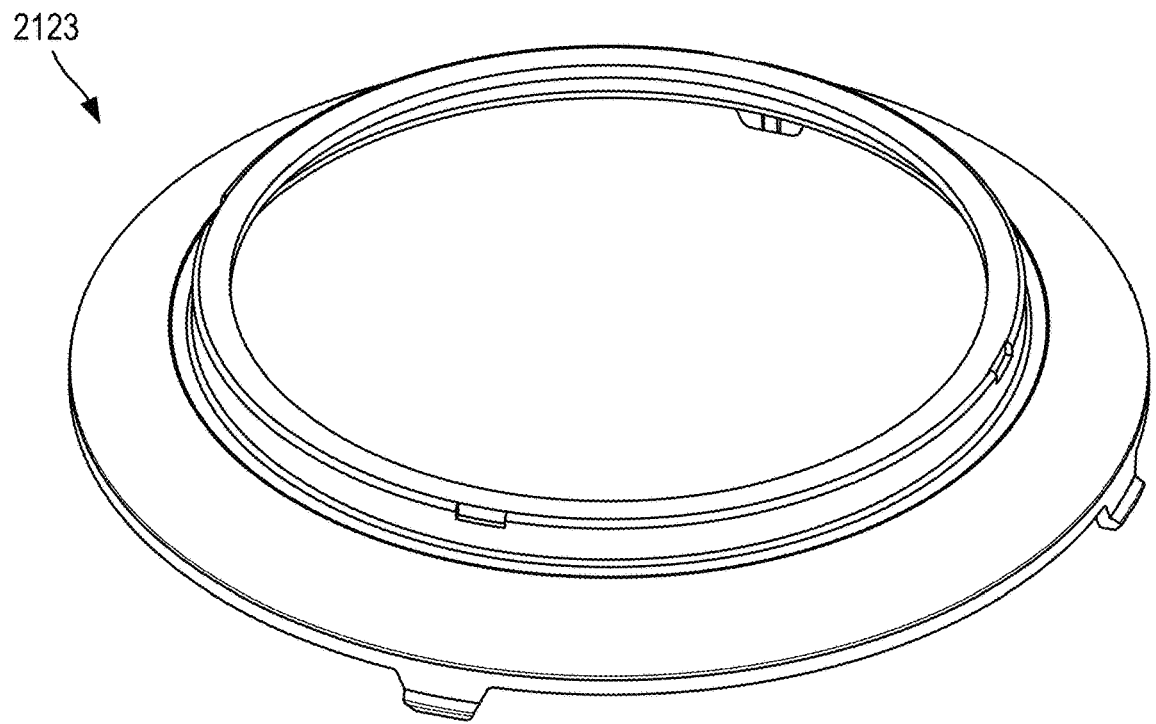
FIG. 24 is a bottom perspective view of a collar cover of the sensor of FIG. 21.
Figure 25:
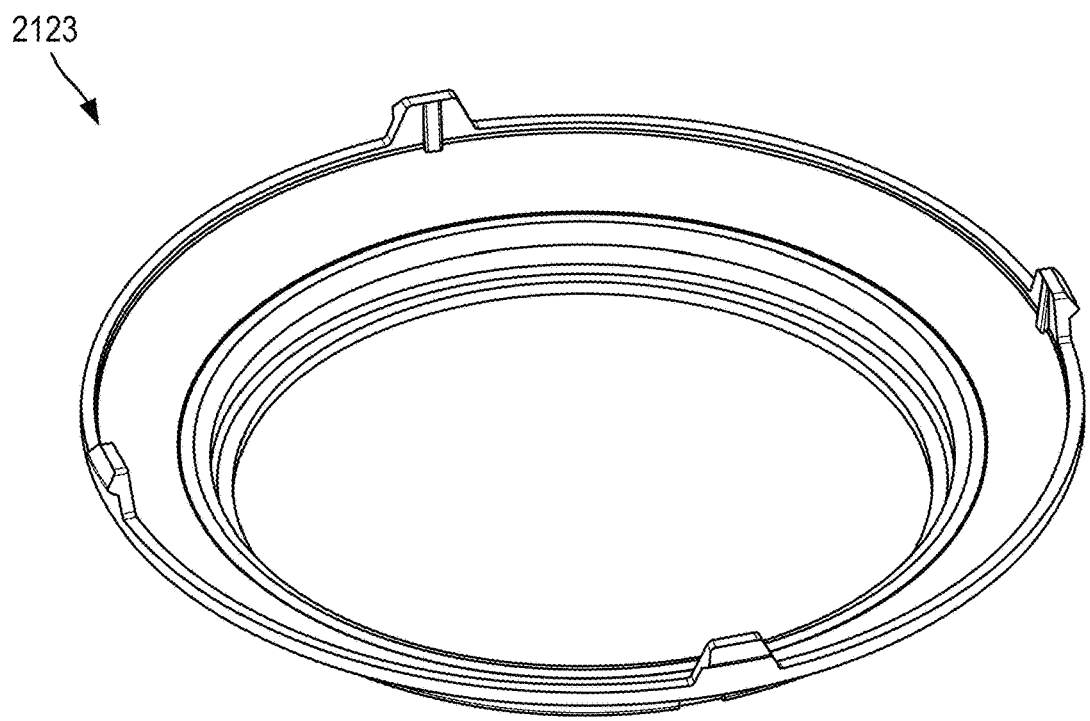
FIG. 25 is a top perspective view of the collar cover of FIG. 24.
Figure 26:
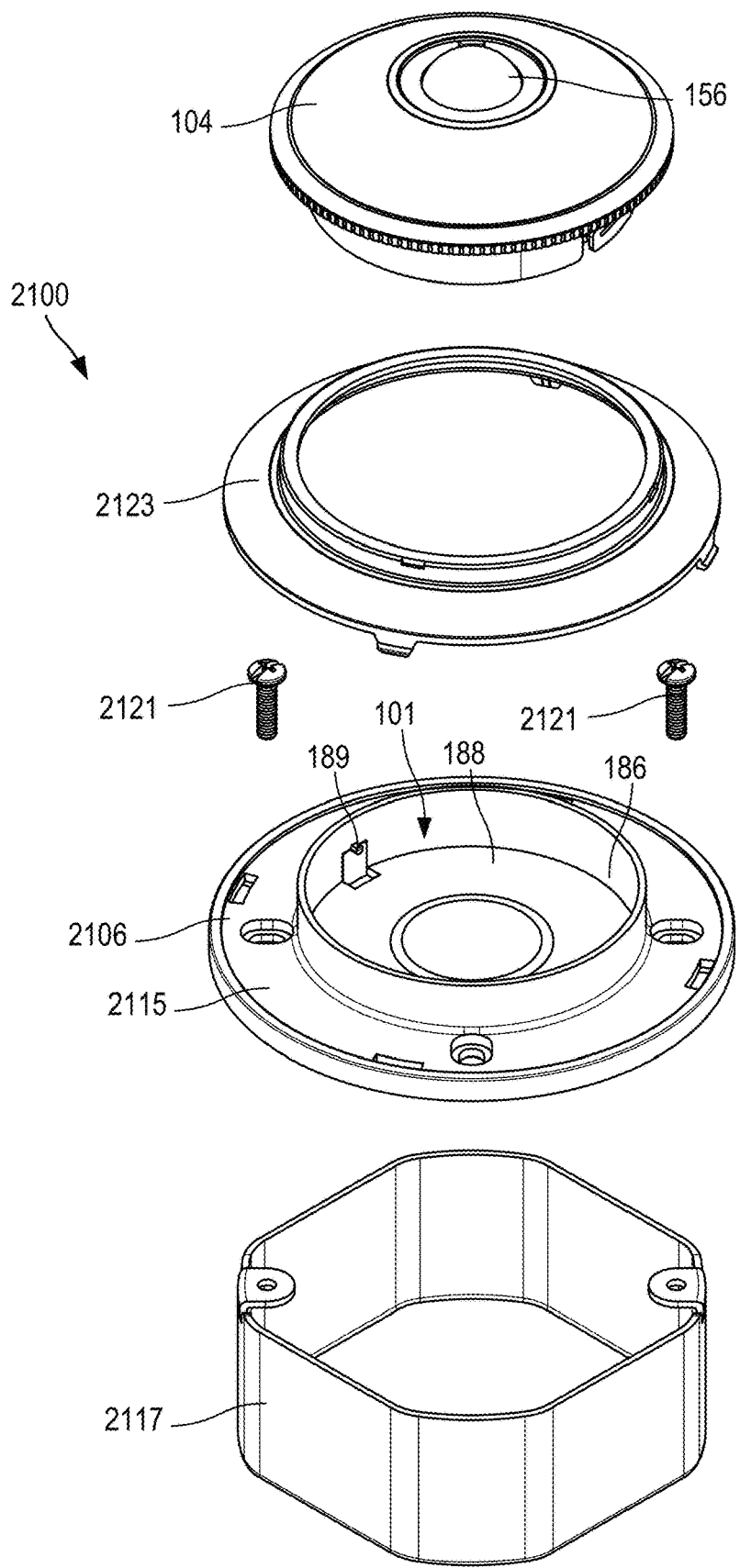
FIG. 26 is an exploded view of the sensor of FIG. 21.

For example, in the embodiment shown in FIGS. 2 and 15, the base 106 has a substantially planar end wall 188 for flush mounting on the mounting surface 1511, such as a ceiling. In other embodiments, the base 106 may be configured as a recessed base. Metal bases 106 may be particularly suitable for recessed applications, although they need not be metal when recessed. As one non-limiting example, FIGS. 16-20 illustrate another example of a sensor 1600 that is substantially similar to the sensor 100 except that the base 1606 includes spring clips 1613 and is configured for recess mounting of the base 106 above a plane of the mounting surface 1511. In other examples, mounting features other than spring clips 1613 may be utilized to mount the base 1606 within the mounting surface 1511.

FIGS. 21-26 illustrate another example of a sensor 2100 that is substantially similar to the sensor 100 except that the base 2106 includes a collar 2115 for mounting of the sensor 2100 on a junction box 2117. The collar 2115 may include one or more mounting apertures 2119 that can receive fasteners 2121 to mount the sensor 2100 to the junction box 2117. In other examples, features or components other than mounting apertures 2119 may be utilized to mount the sensor 2100 to the junction box 2117. Optionally, a collar cover 2123 may be provided that at least partially covers the collar 2115.

Assembly

The sensor 100 may be assembled by assembling the sensor module 102, assembling the cover 104, assembling the sensor module 102 with the cover 104, and then assembling the sensor module 102 and the cover 104 with the base 106. In some embodiments, the base 106 will be installed on or within the mounting surface.

Referring to FIGS. 3 and 4, assembling the sensor module 102 may include supporting the antenna 152 on the side wall surface 118 and coupling the electronics board 110 with the battery enclosure 108. Coupling the electronics board 110 with the battery enclosure 108 may include positioning the contacts through the contact apertures 128 and into the power source cavity 124. Coupling the electronics board 110 with the battery enclosure 108 may also include assembling the electronics board 110 such that the sensing component 134 is facing a direction opposite from the power source cavity 124. In various aspects, coupling the electronics board 110 with the battery enclosure 108 involves tilting the electronics board 110 and inserting an edge of the board 110 with the retention notches 149 underneath the one or more retention arms 121 of the battery enclosure. The electronics board 110 is then pivoted downwardly such that the board 110 causes the engagement arms 120 to form a snap-fit engagement between the engagement notches 148 and the engagement arms 120.

Figure 6:
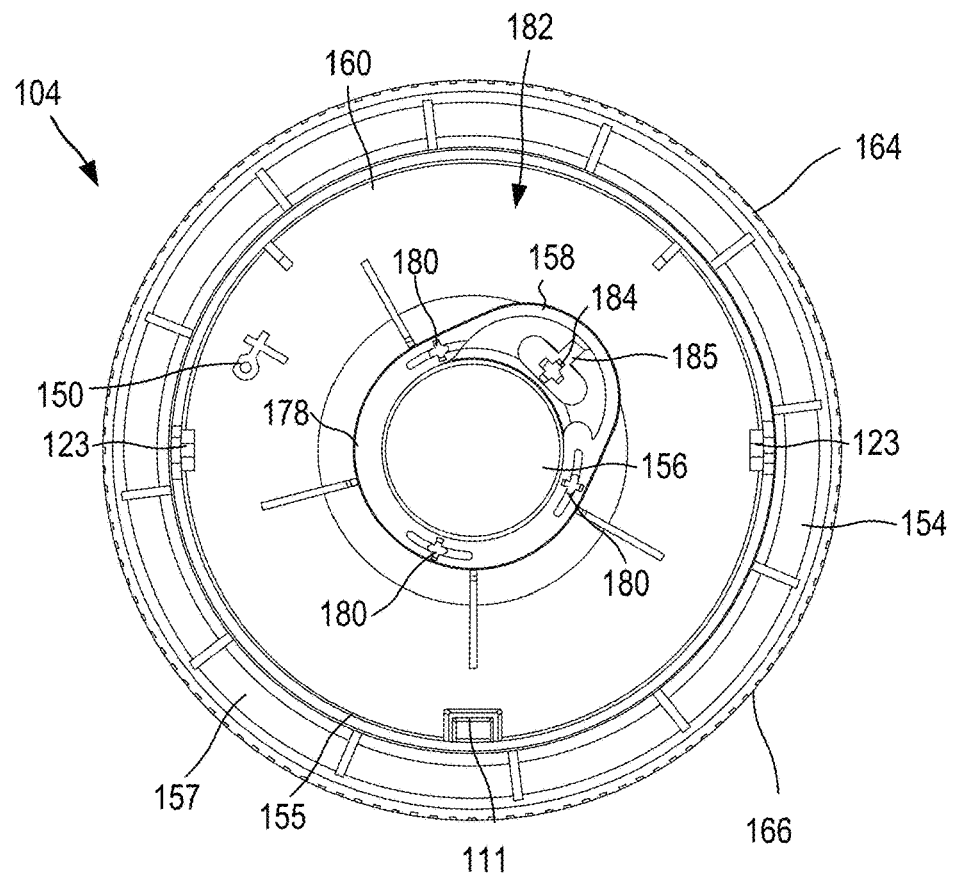
FIG. 6 is a top plan view of the cover assembly of FIG. 5.
Figure 7:
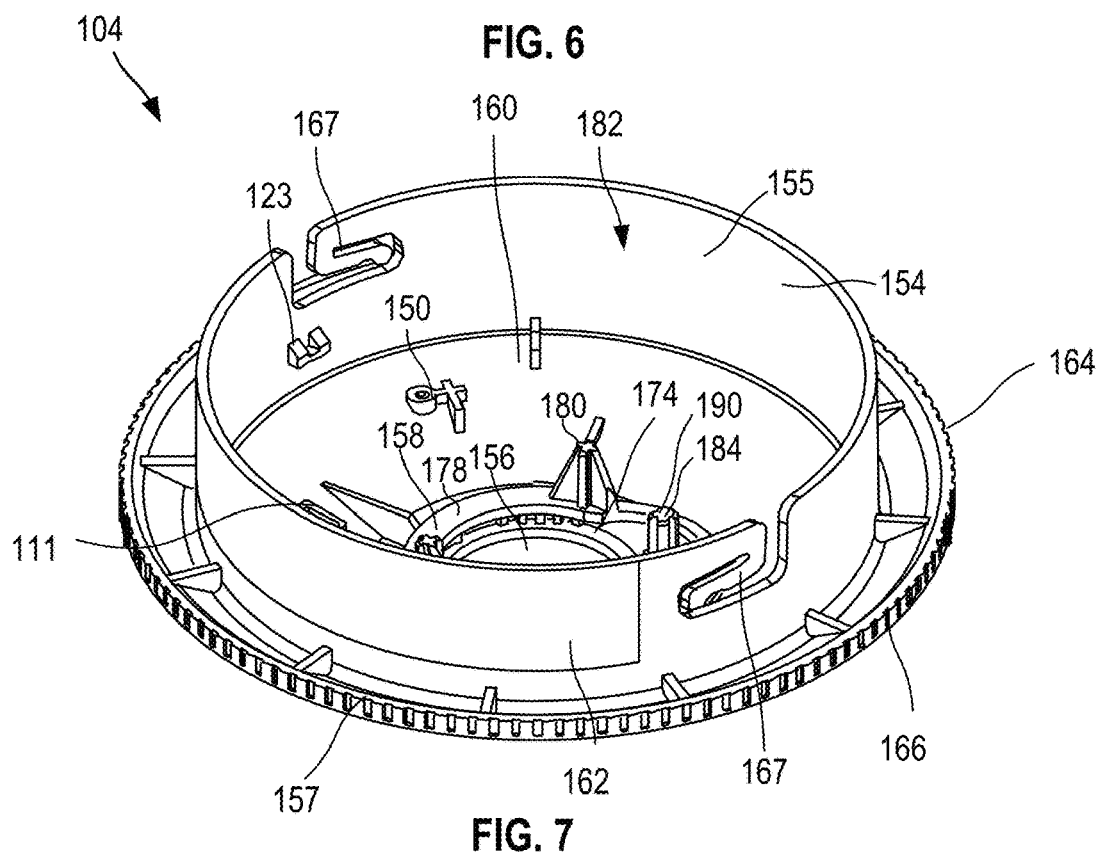
FIG. 7 is a perspective view of the cover assembly of FIG. 5 assembled.

Referring to FIGS. 5-7, assembling the cover 104 may include positioning the optic 156 within the optic aperture 168 and positioning the optic retainer 158 within the module receiving area 182 such that at least a portion of the optic 156 is between the base 178 of the optic retainer 158 and the inner surface 160 of the housing 154. Assembling the cover 104 may include orienting the optic 156 relative to the housing 154 by engaging the alignment notches 176 of the optic 156 with the alignment posts 172 of the housing 154. In various aspects, assembling the cover 104 also includes at least partially positioning the button 184 within the button aperture 170.

Figure 9:
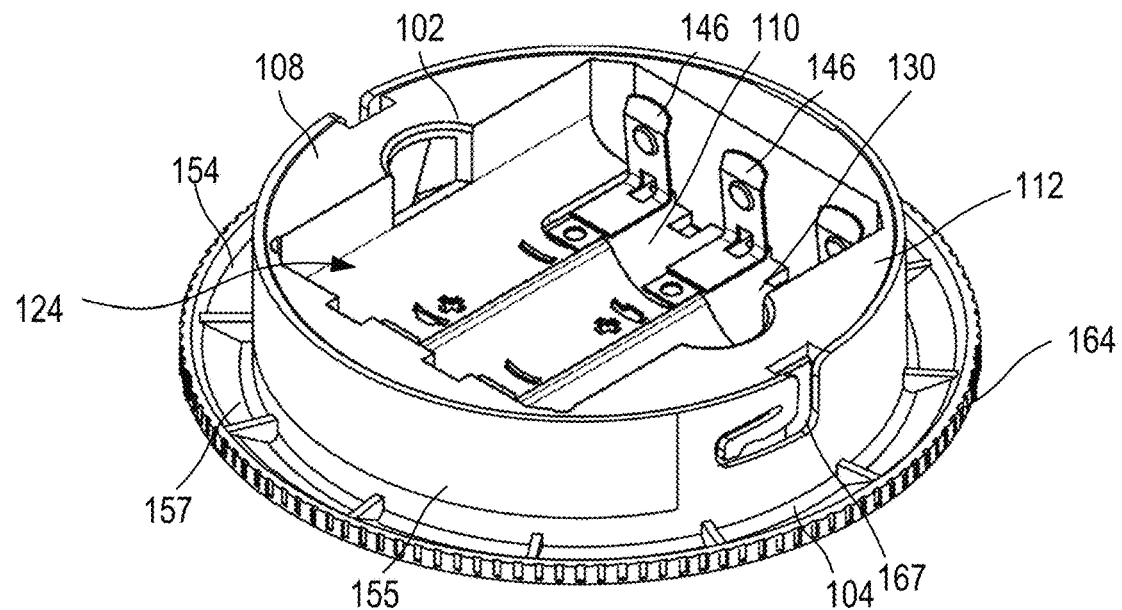
FIG. 9 illustrates the sensor module of FIG. 3 assembled with the cover assembly of FIG. 5.
Figure 10:
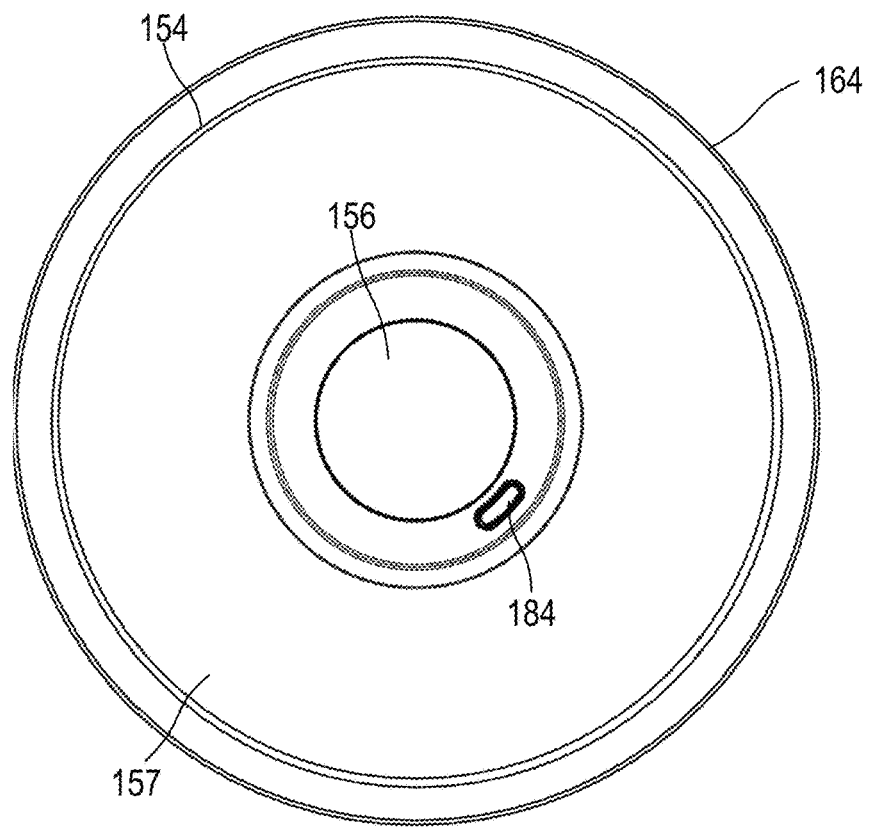
FIG. 10 is a bottom plan view of the assembled sensor module of FIG. 3 and cover assembly of FIG. 5.

Referring to FIGS. 8 and 9, the sensor module 102 is assembled with the cover 104 by positioning the sensor module 102 within the module receiving area 182. In some embodiments, complementary alignment features are provided on the cover 104 and sensor module 102 to ensure a desired orientation between the two. By way only of example, an alignment track 111 may be provided on one of the cover 104 and sensor module 102 and an alignment groove 113 may be provided on the other of the cover 104 and sensor module 102. The sensor module 102 is positioned within the cover 104 by alignment of the track and groove. The sensor module 102 and cover 104 are preferably held together via a snap-fit connection. For example, the retention tabs 122 may be aligned with the retention tabs 123 on the cover 104, and a force may be applied along a z-axis such that the retention tabs 122 engage the positioning tabs 123, and the engagement causes the retention tabs 122 to flex inwards. The force may continue to be applied until the ends of the retention tabs 122 (opposite from the base 112) clear the positioning tabs 123, and the retention tabs 123 are retained within the positioning aperture 131. However, other attachment means are contemplated here.

Figure 11:
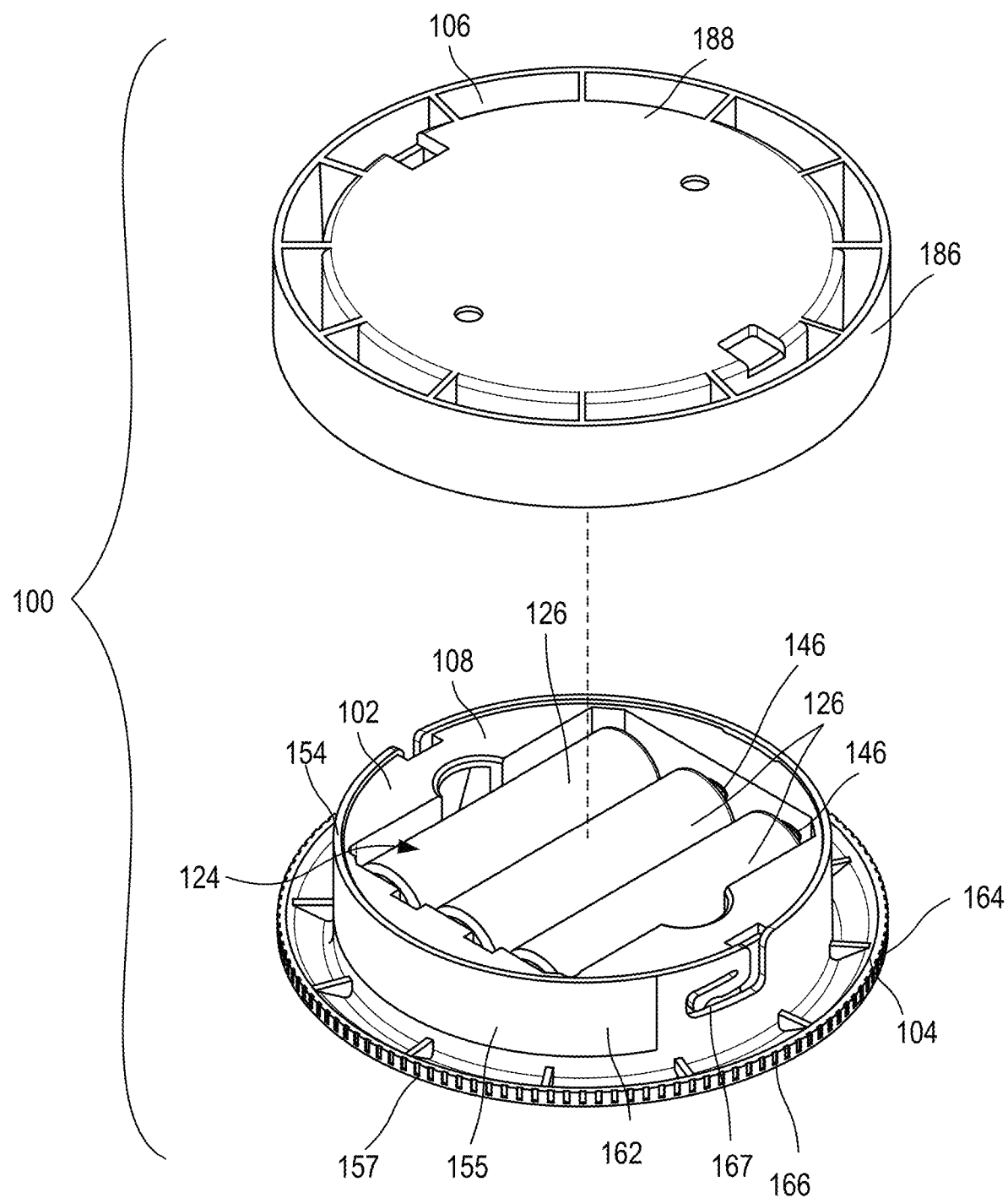
FIG. 11 illustrates the assembled sensor module and cover assembly of FIG. 9 removed from a base of the sensor of FIG. 1.
Figure 12:
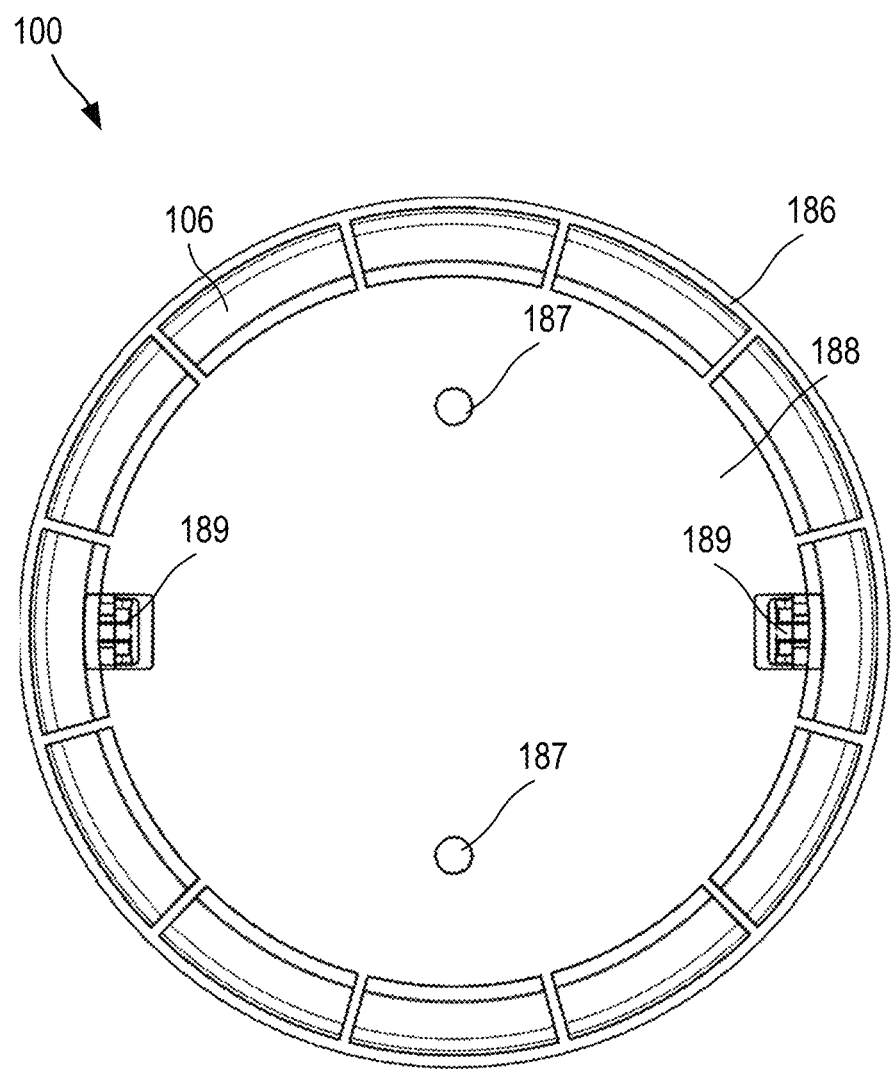
FIG. 12 is a top plan view of the assembled sensor module, cover assembly, and base of FIG. 11.
Figure 13:
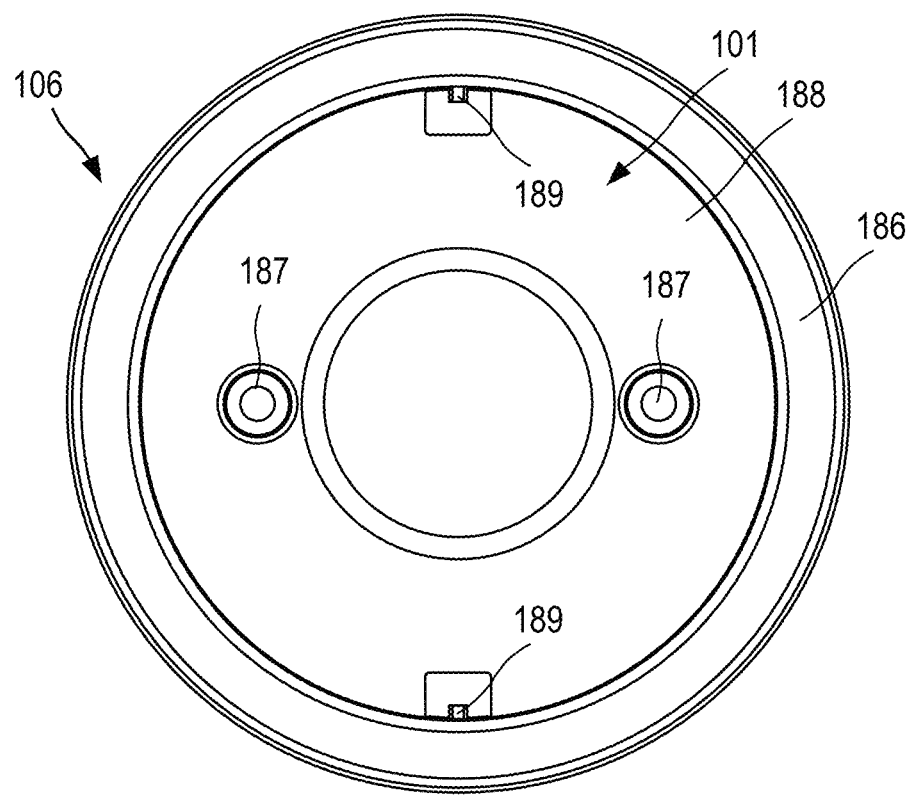
FIG. 13 is a top plan view of the base of the sensor of FIG. 1.
Figure 14:
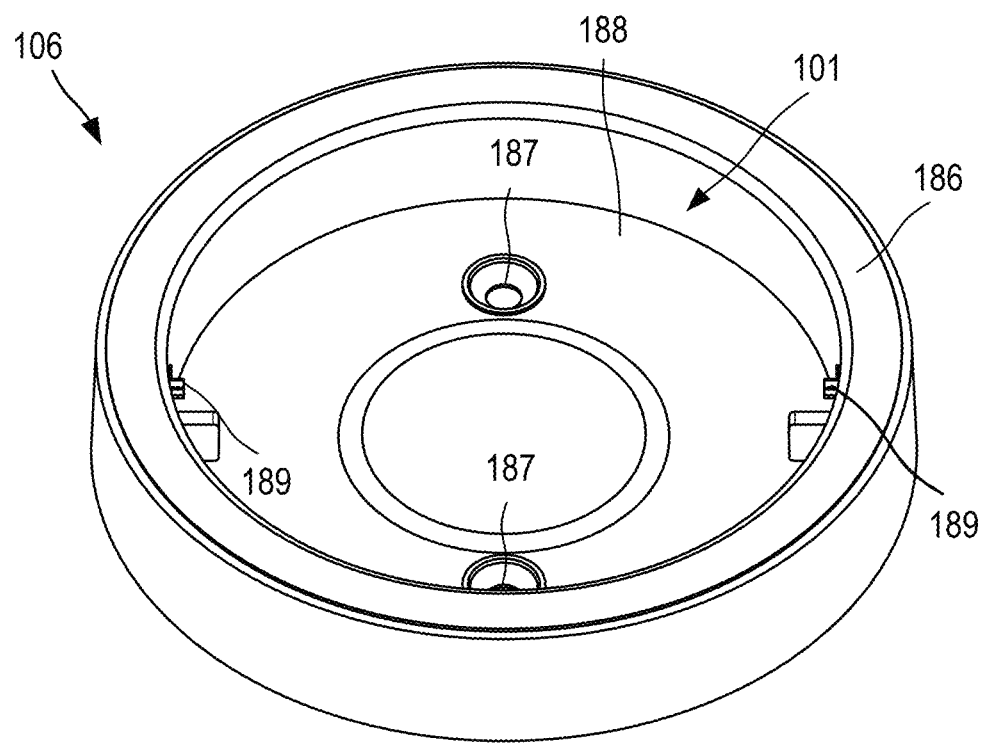
FIG. 14 is a perspective view of the base of FIG. 13.

In various examples, the sensor module 102 is assembled with the cover 104 such that the side wall 155 of the cover 104 at least partially overlaps the side wall 116. In various examples, the antenna 152 may be between the side wall surface 118 and side wall 155 when the sensor module 102 is assembled with the cover 104. In various aspects, the sensor module 102 is assembled with the cover 104 such that the first side 142 of the PCB 130 is more proximate to the optic aperture 168 than the second side 144 of the PCB 130. In certain examples, the sensor module 102 is assembled with the cover 104 such that the button 184 of the cover 104 is aligned with the activation switch 138 and/or the light source 140 of the sensor module 102. In various aspects, as illustrated in FIG. 11, batteries 126 may be positioned within the power source cavity 124 before or after the sensor module 102 is assembled with the cover 104.

Referring to FIGS. 1, 2, 11, 12, and 15, the sensor module 102 and the cover 104 may be assembled with the base 106 to form the sensor 100 by positioning the side wall 155 (and the sensor module 102 in the module receiving area 182) in the receiving area defined by the cover 104. In certain aspects, the side wall 186 of the base 106 at least partially overlaps the side wall 155 of the cover 104. In various cases, and as best illustrated in FIGS. 1 and 2, the side wall 186 may abut the end wall 157 of the cover 104. Assembling the sensor 100 may also include engaging the base-locking features 167 of the cover 104 with locking features 189 on the base 106 such that the cover 104 is coupled with the base 106 via a snap-fit or twist lock connection.

As should be apparent, the overall assembly of the various components of the sensor 100 does not require any tools. Rather, the electronics board 110 snap-fits onto the battery enclosure 108 to form the sensor module 102, the sensor module 102 snap-fits within the cover 104, and then the cover 104 twist-locks onto the base 106. In various aspects, the assembly of the components of the sensor 100 is generally along a single axis (e.g., a z-axis), which may facilitate installation and allow for installation of the sensor 100 in environments with limited working space.

EXAMPLES

A collection of exemplary embodiments, including at least some explicitly enumerated as "Examples" providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

Example 1. A sensor comprising: a sensor module comprising: an electronics board comprising a sensing component, a controller, and a flex antenna; and a battery enclosure coupled with the electronics board and comprising a base and a side wall having an outer wall surface, wherein the flex antenna is supported on the outer wall surface such that the flex antenna forms a radially outermost portion of the sensor module, wherein the flex antenna is conformable to a profile of the outer wall surface, wherein the sensor module is configured to support a power source on the sensor module, and wherein the sensor is an indoor sensor.

Example 2. The sensor of any of the preceding or subsequent examples or combination of examples, wherein the battery enclosure comprises at least one retention arm and at least one engagement arm on opposing portions of the base, and wherein the at least one retention arm and the at least one engagement arm snap-fit the electronics board such that the electronics board is engaged with the battery enclosure.

Example 3. The sensor of any of the preceding or subsequent examples or combination of examples, wherein the sensing component comprises at least one of a passive infrared sensing component or other suitable motion or occupancy sensing component, a photodiode or other light sensing component, a microphonic circuit or other sound sensing component, a humidity sensing component, an air quality sensing component, a smoke sensing component, a temperature sensing component, and/or a carbon dioxide sensing component.

Example 4. The sensor of any of the preceding or subsequent examples or combination of examples, wherein the electronics board further comprises a printed circuit board, and wherein the sensing component and the controller are supported on the printed circuit board.

Example 5. The sensor of any of the preceding or subsequent examples or combination of examples, wherein the printed circuit board comprises a first surface and a second surface opposite from the first surface, wherein the controller and the sensing component are supported on the first surface, and wherein the electronics board further comprises a plurality of power source contacts integral with the printed circuit board and extending away from the second surface in a direction opposite from the first surface.

Example 6. The sensor of any of the preceding or subsequent examples or combination of examples, wherein the base defines a power source cavity comprising a contact aperture, and wherein the electronics board is coupled with the battery enclosure such that at least one of the plurality of power source contacts extends through the contact aperture.

Example 7. The sensor of any of the preceding or subsequent examples or combination of examples, further comprising the power source, wherein the power source comprises at least one battery, and wherein the at least one battery is supported within the power source cavity and such that at least a portion of the base of the battery enclosure is between the at least one battery and the printed circuit board.

Example 8. The sensor of any of the preceding or subsequent examples or combination of examples, wherein the side wall comprises a non-metal material.

Example 9. The sensor of any of the preceding or subsequent examples or combination of examples, wherein the controller is configured to control the sensor such that the sensor is in a hibernation mode until an activation event is detected by the sensing component.

Example 10. The sensor of any of the preceding or subsequent examples or combination of examples, wherein the activation event comprises a predetermined pattern of light or a predetermined sound.

Example 11. The sensor of any of the preceding or subsequent examples or combination of examples, further comprising a sensor base configured to support the sensor module on a mounting surface, wherein the sensor module is removable from the sensor base.

Example 12. The sensor of any of the preceding or subsequent examples or combination of examples, further comprising a sensor cover, the sensor cover comprising: a housing defining an optic aperture and comprising an inner surface defining sensor module receiving area, wherein the sensor module is received within the sensor module receiving area; and an optic supported on the housing and extending at least partially through the optic aperture.

Example 13. The sensor of any of the preceding or subsequent examples or combination of examples, further comprising a optic retainer positionable within the sensor module receiving area, wherein the optic retainer comprises a base and at least one post, wherein the base engages the optic such that at least a portion of the optic is retained between the base and the inner surface of the housing, and wherein the at least one post engages the sensor module.

Example 14. The sensor of any of the preceding or subsequent examples or combination of examples, wherein the housing further defines a button aperture adjacent to the optic aperture, and wherein the base of the optic retainer comprises a button that is positionable within the button aperture and movable relative to the base.

Example 15. The sensor of any of the preceding or subsequent examples or combination of examples, wherein the electronics board further comprises an activation switch, and wherein the button is movable relative to the base to selectively engage the activation switch, and wherein engagement of the button with the activation switch activates the sensor.

Example 16. The sensor of any of the preceding or subsequent examples or combination of examples, wherein the electronics board further comprises at least one light source, and wherein the light source is activated upon activation of the activation switch.

Example 17. The sensor of any of the preceding or subsequent examples or combination of examples, wherein the inner surface of the housing comprises at least one alignment post adjacent to the optic aperture, and wherein the optic comprises at least one alignment notch that is engageable with the at least one alignment post to rotationally lock the optic relative to the housing.

Example 18. A sensor comprising: a sensor module comprising an electronics board and a battery enclosure, wherein the electronics board is coupled with the battery enclosure, and wherein the electronics board comprises a sensing component; and a sensor cover comprising: a housing comprising an inner surface defining sensor module receiving area, wherein the sensor module is received within the sensor module receiving area, and wherein the housing defines an optic aperture and a button aperture; an optic supported on the housing and extending at least partially through the optic aperture; and a optic retainer wherein the optic retainer comprises a base and at least one post extending from the base, wherein the base of the optic retainer comprises a button that is positionable within the button aperture and movable relative to the base such that the button selectively engages the sensor module, wherein the optic retainer is positionable within the sensor module receiving area such that the base engages the optic, at least a portion of the optic is retained between the base and the inner surface of the housing, and the at least one post engages the sensor module.

Example 19. The sensor of any of the preceding or subsequent examples or combination of examples, wherein: the sensor is an indoor sensor; the electronics board further comprises a flex antenna; and the sensing component comprises at least one of a passive infrared sensor, a photodiode, a microphonic circuit, a humidity sensor, an air quality sensor, a smoke sensor, a temperature sensors, or a carbon dioxide sensor.

Example 20. The sensor of any of the preceding or subsequent examples or combination of examples, wherein the inner surface of the housing comprises at least one alignment post adjacent to the optic aperture, and wherein the optic comprises at least one alignment notch that is engageable with the at least one alignment post to rotationally lock the optic relative to the housing.

Different arrangements of the components depicted in the drawings or described above, as well as components and steps not shown or described are possible. Similarly, some features and sub-combinations are useful and may be employed without reference to other features and sub-combinations. Examples of the invention have been described for illustrative and not restrictive purposes, and alternative examples will become apparent to readers of this patent. Accordingly, the present invention is not limited to the examples described above or depicted in the drawings, and various examples and modifications may be made without departing from the scope of the claims below.

That which is claimed:

1. A sensor comprising:
    a sensor module comprising:
        an electronics board comprising a sensing component, a controller, and a flex antenna; and
        a battery enclosure coupled with the electronics board and comprising a base and a side wall having an outer wall surface,
    wherein the flex antenna is supported on the outer wall surface such that the flex antenna forms a radially outermost portion of the sensor module,
    wherein the flex antenna is conformable to a profile of the outer wall surface,
    wherein the sensor module is configured to support a power source on the sensor module, and
    wherein the sensor is an indoor sensor.

2. The sensor of claim 1, wherein the battery enclosure comprises at least one retention arm and at least one engagement arm on opposing portions of the base, and wherein the at least one retention arm and the at least one engagement arm snap-fit the electronics board such that the electronics board is engaged with the battery enclosure.

3. The sensor of claim 1, wherein the sensing component comprises at least one of a motion sensing component, an occupancy sensing component, a light sensing component, a sound sensing component, a humidity sensing component, an air quality sensing component, a smoke sensing component, a temperature sensing component, and/or a carbon dioxide sensing component.

4. The sensor of claim 1, wherein the electronics board further comprises a printed circuit board, and wherein the sensing component and the controller are supported on the printed circuit board.

5. The sensor of claim 4, wherein the printed circuit board comprises a first surface and a second surface opposite from the first surface, wherein the controller and the sensing component are supported on the first surface, and wherein the electronics board further comprises a plurality of power source contacts on the printed circuit board and extending away from the second surface in a direction opposite from the first surface.

6. The sensor of claim 5, wherein the base defines a power source cavity comprising a contact aperture, and wherein the electronics board is coupled with the battery enclosure such that at least one of the plurality of power source contacts extends through the contact aperture.

7. The sensor of claim 6, further comprising the power source, wherein the power source comprises at least one battery, and wherein the at least one battery is supported within the power source cavity and such that at least a portion of the base of the battery enclosure is between the at least one battery and the printed circuit board.

8. The sensor of claim 1, wherein the side wall comprises a non-metal material.

9. The sensor of claim 1, wherein the controller is configured to control the sensor such that the sensor is in a hibernation mode until an activation event is detected by the sensing component.

10. The sensor of claim 9, wherein the activation event comprises a predetermined pattern of light or a predetermined sound.

11. The sensor of claim 1, further comprising a sensor base configured to support the sensor module on a mounting surface, wherein the sensor module is removable from the sensor base.

12. The sensor of claim 1, further comprising a sensor cover, the sensor cover comprising:
    a housing defining an optic aperture and comprising an inner surface defining sensor module receiving area, wherein the sensor module is received within the sensor module receiving area; and
    an optic supported on the housing and extending at least partially through the optic aperture.

13. The sensor of claim 12, further comprising a optic retainer positionable within the sensor module receiving area, wherein the optic retainer comprises a base and at least one post, wherein the base engages the optic such that at least a portion of the optic is retained between the base and the inner surface of the housing, and wherein the at least one post engages the sensor module.

14. The sensor of claim 13, wherein the housing further defines a button aperture adjacent to the optic aperture, and wherein the base of the optic retainer comprises a button that is positionable within the button aperture and movable relative to the base.

15. The sensor of claim 14, wherein the electronics board further comprises an activation switch, and wherein the button is movable relative to the base to selectively engage the activation switch, and wherein engagement of the button with the activation switch activates the sensor.

16. The sensor of claim 15, wherein the electronics board further comprises at least one light source, and wherein the light source is activated upon activation of the activation switch.

17. The sensor of claim 12, wherein the inner surface of the housing comprises at least one alignment post adjacent to the optic aperture, and wherein the optic comprises at least one alignment notch that is engageable with the at least one alignment post to rotationally lock the optic relative to the housing.

18. A sensor comprising:
    a sensor module comprising an electronics board and a battery enclosure, wherein the electronics board is coupled with the battery enclosure, and wherein the electronics board comprises a sensing component; and
    a sensor cover comprising:
        a housing comprising an inner surface defining sensor module receiving area,
            wherein the sensor module is received within the sensor module receiving area, and wherein the housing defines an optic aperture and a button aperture;
        an optic supported on the housing and extending at least partially through the optic aperture; and an optic retainer wherein the optic retainer comprises a base and at least one post extending from the base, wherein the base of the optic retainer comprises a button that is positionable within the button aperture and movable relative to the base such that the button selectively engages the sensor module, wherein the optic retainer is positionable within the sensor module receiving area such that the base engages the optic, at least a portion of the optic is retained between the base and the inner surface of the housing, and the at least one post engages the sensor module.

19. The sensor of claim 18, wherein:

the sensor is an indoor sensor;

the electronics board further comprises a flex antenna; and the sensing component comprises at least one of a motion sensing component, an occupancy sensing component, a light sensing component, a sound sensing component, a humidity sensing component, an air quality sensing component, a smoke sensing component, a temperature sensing component, and/or a carbon dioxide sensing component.

20. The sensor of claim 18, wherein the inner surface of the housing comprises at least one alignment post adjacent to the optic aperture, and wherein the optic comprises at least one alignment notch that is engageable with the at least one alignment post to rotationally lock the optic relative to the housing.

* * * * *